United States Patent
Wirtz et al.

(10) Patent No.: US 12,005,402 B2
(45) Date of Patent: Jun. 11, 2024

(54) TERPENE EXTRACTION SYSTEM AND METHOD OF EXTRACTING TERPENES FROM PLANT BIOMASS

(71) Applicant: Python Extraction Systems, LLC, Port Huron, MI (US)

(72) Inventors: Robert N. Wirtz, Royal Oak, MI (US); Dylan Havey, Eugene, OR (US)

(73) Assignee: PYTHON EXTRACTION SYSTEMS, LLC, Port Huron, MI (US)

( * ) Notice: Subject to any disclaimer, the term of this patent is extended or adjusted under 35 U.S.C. 154(b) by 148 days.

(21) Appl. No.: 17/592,967

(22) Filed: Feb. 4, 2022

(65) Prior Publication Data
US 2022/0241699 A1    Aug. 4, 2022

Related U.S. Application Data

(60) Provisional application No. 63/145,963, filed on Feb. 4, 2021.

(51) Int. Cl.
*B01D 8/00* (2006.01)
*F04B 37/08* (2006.01)

(52) U.S. Cl.
CPC ............ *B01D 8/00* (2013.01); *F04B 37/08* (2013.01)

(58) Field of Classification Search
CPC ....... A61K 2236/39; C12P 5/007; B01D 8/00; F04B 37/08
See application file for complete search history.

(56) References Cited

U.S. PATENT DOCUMENTS

| | | | |
|---|---|---|---|
| 10,507,407 B2 | 12/2019 | Galyuk | |
| 10,717,056 B1* | 7/2020 | Gokay | B01D 3/346 |
| 10,814,248 B2 | 10/2020 | Galyuk | |
| 2004/0147767 A1* | 7/2004 | Whittle | A61K 31/05 |
| | | | 549/390 |
| 2013/0240347 A1* | 9/2013 | Hackleman | B01D 3/40 |
| | | | 202/185.1 |
| 2017/0145445 A1* | 5/2017 | Bazzana | C12P 7/10 |
| 2019/0151771 A1* | 5/2019 | Thomas | B01D 5/0003 |
| 2019/0153484 A1* | 5/2019 | Bray | C12P 17/06 |
| 2020/0079751 A1* | 3/2020 | Durkacz | C07C 37/74 |
| 2020/0237840 A1* | 7/2020 | Morrow | C11B 9/0053 |
| 2022/0346425 A1* | 11/2022 | Alsayar | A23N 15/00 |

FOREIGN PATENT DOCUMENTS

WO    WO2020252593 A1    12/2020

OTHER PUBLICATIONS

International Search Report and Written Opinion for International Application No. PCT/US22/15273 dated May 13, 2022 (14 pages).

* cited by examiner

*Primary Examiner* — Lionel Nouketcha
(74) *Attorney, Agent, or Firm* — Reising Ethington P.C.

(57) ABSTRACT

A terpene extraction system and method of extracting terpenes from plant biomass are described. The plant biomass is derived from a *Cannabis* source plant, as one example source plant. A reactor assembly and one or more cold traps can be a part of the system, and can be involved in the method. The reactor assembly has a housing that receives the plant biomass, and has an agitator that moves the plant biomass in the housing, per an example. The cold trap(s) is situated downstream of the reactor assembly. A heater and a vacuum pump can also be part of the terpene extraction system, and can be involved in the method.

16 Claims, 22 Drawing Sheets

TERPENE EXTRACTION SYSTEM AND METHOD OF EXTRACTING TERPENES FROM PLANT BIOMASS

CROSS-REFERENCE TO RELATED APPLICATION

This application claims the benefit of U.S. Provisional Patent Application No. 63/145,963, with a filing date of Feb. 4, 2021, the contents of which are hereby incorporated by reference in their entirety.

TECHNICAL FIELD

This disclosure relates generally to the extraction of terpenes from plant biomass, and relates more specifically to equipment and processes employed to extract terpenes from plant biomass.

BACKGROUND

Terpenes are compounds found in an array of plants. Terpenes are known to be largely responsible for a plant's aroma. Diverse products from food additives to cosmetics have terpenes added to them amid production for enhancements in flavor and scent. Due to their fragile and volatile nature, extracting terpenes from certain plants and isolating them has proved challenging. A typical extraction technique in the *Cannabis* industry, for example, involves the use of supercritical fluids like carbon dioxide ($CO_2$) as a solvent for extracting the terpenes. But this approach, as well as others, does not always yield the quality and purity levels often desired of extracted terpenes, and can sometimes even cause degradation during the extraction procedure.

SUMMARY

According to an embodiment, a terpene extraction system may include a reactor assembly, a heater, and one or more cold traps. The reactor assembly has a housing and an agitator. The housing has an interior. The interior receives plant biomass. The agitator has one or more paddles. The paddle(s) is situated at the interior. The heater can interact with the housing in order to increase the temperature of the interior. The interaction can be via communicable tubing, piping, hosing, and/or fittings, per an embodiment. The cold trap(s) is situated downstream of the reactor assembly and can communicate with the housing.

According to another embodiment, a method of extracting terpenes from plant biomass may include multiple steps. One step may involve heating the plant biomass in a reactor assembly. Another step may involve stirring the plant biomass in the reactor assembly. A further step may involve applying a vacuum in the reactor assembly, thereby subjecting the plant biomass to the applied vacuum. Yet another step may involve freezing resultant water and terpene vapor mixture from the reactor assembly by way of one or more cold traps.

According to yet another embodiment, a terpene extraction system may include a reactor assembly, a heater, a pump, a vacuum pump, and one or more cold traps. The reactor assembly has a housing, one or more paddles, and a motor. The housing receives plant biomass. The housing has a first wall and a second wall. The first and second walls establish a through-passage. The paddle(s) stirs the received plant biomass. The motor drives movement of the paddle(s). The heater heats fluid. The pump moves the heated fluid through the housing's through-passage. The vacuum pump reduces a pressure within the housing. The cold trap(s) receives resultant water and terpene vapor mixture from the reactor assembly.

According to a further embodiment, a terpene extraction system may include a reactor assembly, a first set of cold traps, and a second set of cold traps. The reactor assembly has a housing and one or more paddles. The housing receives plant biomass. The paddle(s) stirs the plant biomass received in the housing. The first set of cold traps is situated downstream of the reactor assembly. The first set of cold traps includes a first primary cold trap and a first secondary cold trap. The first primary and secondary cold traps exhibit a series arrangement with respect to each other. The second set of cold traps exhibits a parallel arrangement relative to the first set of cold traps. The second set of cold traps includes a second primary cold trap and a second secondary cold trap. The second primary and secondary cold traps exhibit a series arrangement with respect to each other.

BRIEF DESCRIPTION OF THE DRAWINGS

The following detailed description of certain embodiments and best mode will be set forth with reference to the accompanying drawings, in which.

DETAILED DESCRIPTION

The drawings present embodiments of a terpene extraction system 10 and method that are employed to extract terpenes from a plant biomass. The plant biomass subject to terpene extraction can be derived from various source plants including, as but one example, a *Cannabis* source plant. Unlike past approaches, the terpene extraction system 10 and method have been shown to maximize the amount of terpenes extracted from a particular batch of plant biomass, and can yield terpenes that exhibit the higher quality and higher purity levels so often desired. In the *Cannabis* source plant example, the terpene extraction system 10 and method effectively and efficiently extract terpenes present in the plant biomass, furnishing remainder cannabinoid compounds that are otherwise unharmed and intact and suitable for further processing. Moreover, the terpene extraction system 10 and method, as described below, are designed and constructed to mass-produce extracted terpenes in a largely uninterrupted and continuous manner. Extraction of terpenes according to an embodiment is a solventless procedure and process—that is, a solvent such as carbon dioxide ($CO_2$) is not used amid the extraction process. Furthermore, as used herein, downstream refers to a direction in which prepared resultants of the plant biomass are advanced through the terpene extraction system 10, and upstream refers to a direction that is opposite the downstream direction.

Figure 1:
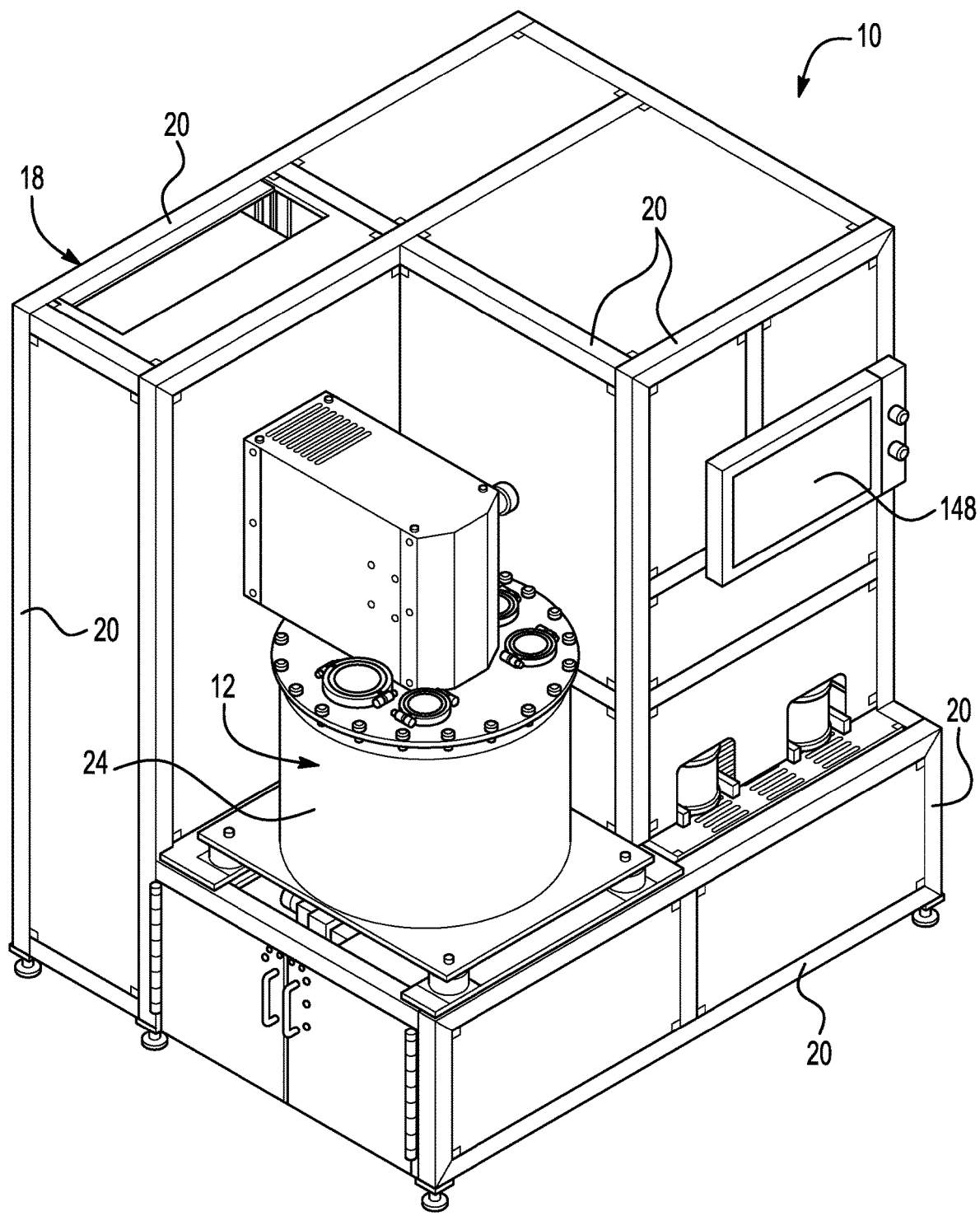
FIG. 1 is a perspective view of a first embodiment of a terpene extraction machine and system, this view depicting a multitude of guards shielding certain components of the terpene extraction system from visibility.

The terpene extraction system 10 can have different designs, constructions, and components in various embodiments depending in part upon among other factors—the quantity of the plant biomass to be subjected to extraction in a single batch and the intended amount of terpenes to be extracted from a particular plant biomass batch. In the embodiment of FIGS. 1-17, the terpene extraction system 10 is a machine made-up of an assemblage of components that includes a reactor assembly 12, a first set of cold traps 14, and a second set of cold traps 16; still, in other embodiments the terpene extraction system could have more, less, and/or different components than those set forth herein. With reference to FIG. 1, these components, as well as others described elsewhere, can be packaged together and supported on a frame assembly 18. The frame assembly 18 has a number of metal bars 20 attached together to establish the overall structure and skeleton of the terpene extraction system 10. Guard walls and doors can be installed among the frame assembly 18 to shield certain components of the terpene extraction system 10. In FIG. 1, for instance, the first and second sets of cold traps 14, 16 are shielded behind guard walls and doors and hence are not visible in this view.

Figure 2:
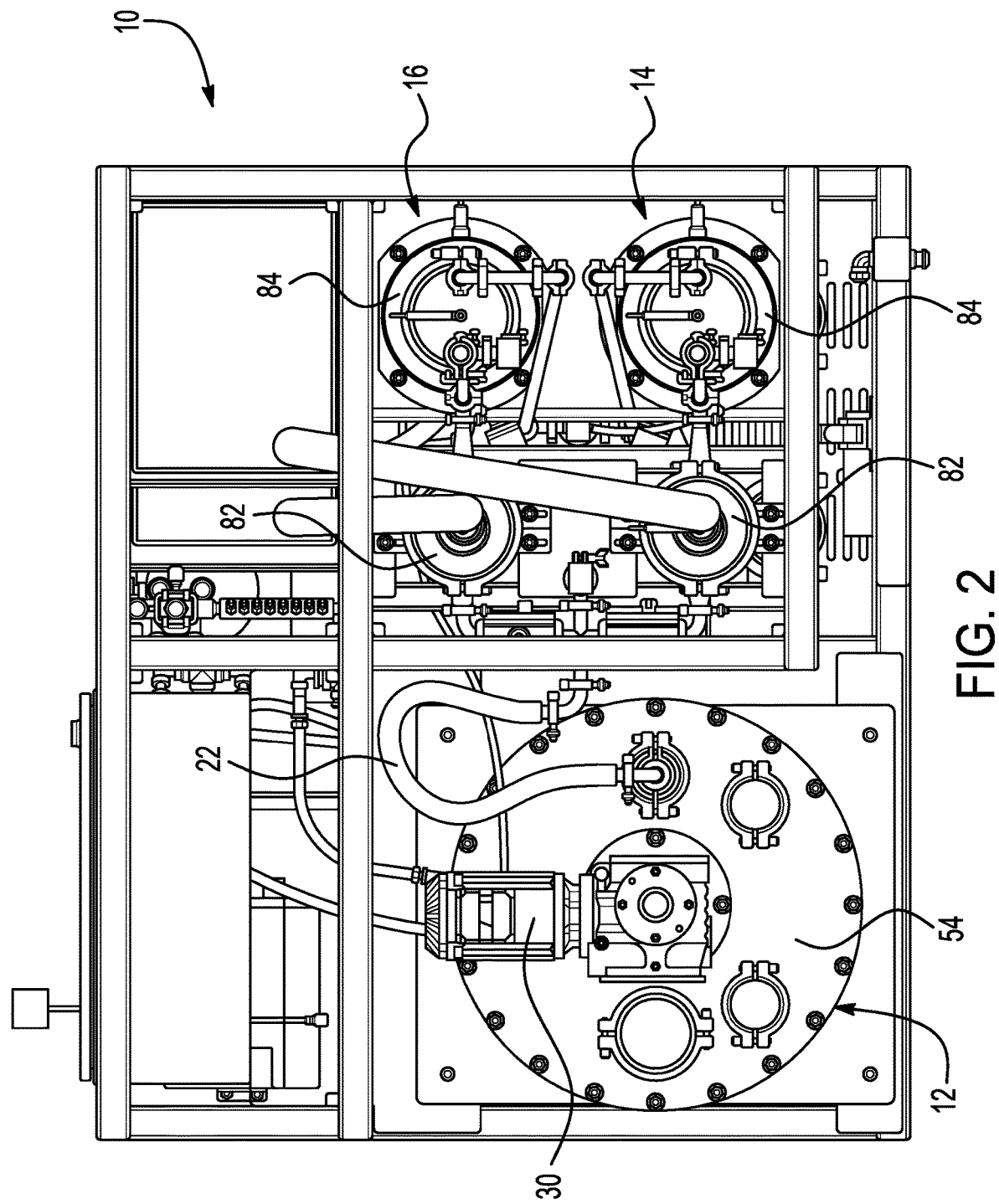
FIG. 2 is a top view of the terpene extraction system (guards removed henceforth)

The reactor assembly 12 serves to vaporize batches of plant biomass in order to produce a water and terpene vapor mixture ready for downstream processing. In the example of *Cannabis* plant biomass, the reactor assembly 12 is designed and constructed to perform this course of action in a gentle and smooth manner in order to ultimately yield extracted and isolated terpenes of higher quality and higher purity. The reactor assembly 12 can have different designs, constructions, and components in various embodiments. In the embodiment here, vaporization of the plant biomass involves precise control of temperature, pressure, and movement of the plant biomass at the reactor assembly 12. With respect to the first and second sets of cold traps 14, 16, the reactor assembly 12 is situated upstream of both of the cold traps 14, 16, and fluidly communicates with the cold traps 14, 16 by way of a main tube 22 (FIG. 2).

Figure 5:
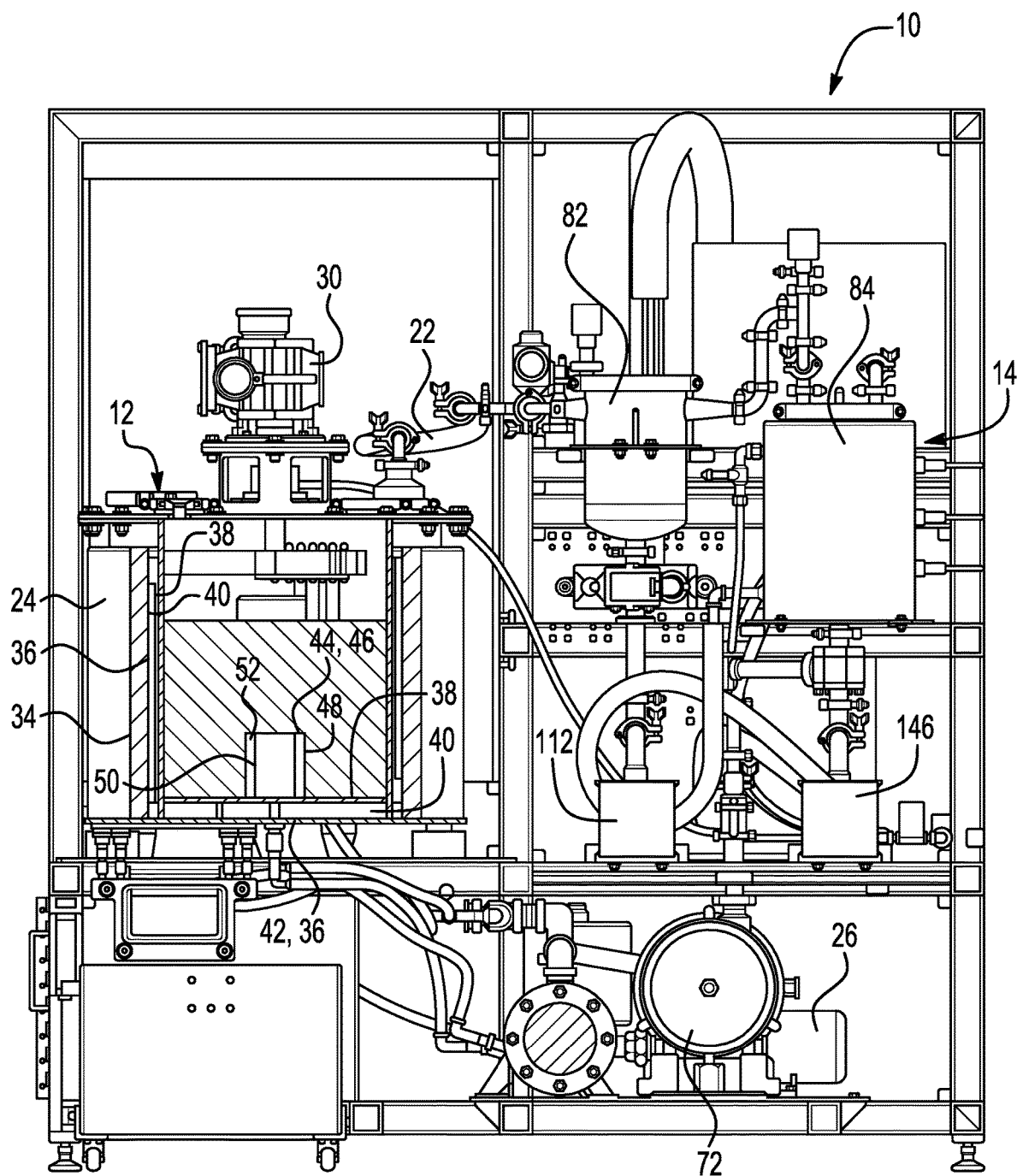
FIG. 5 is another sectional view of the terpene extraction system.
Figure 6:
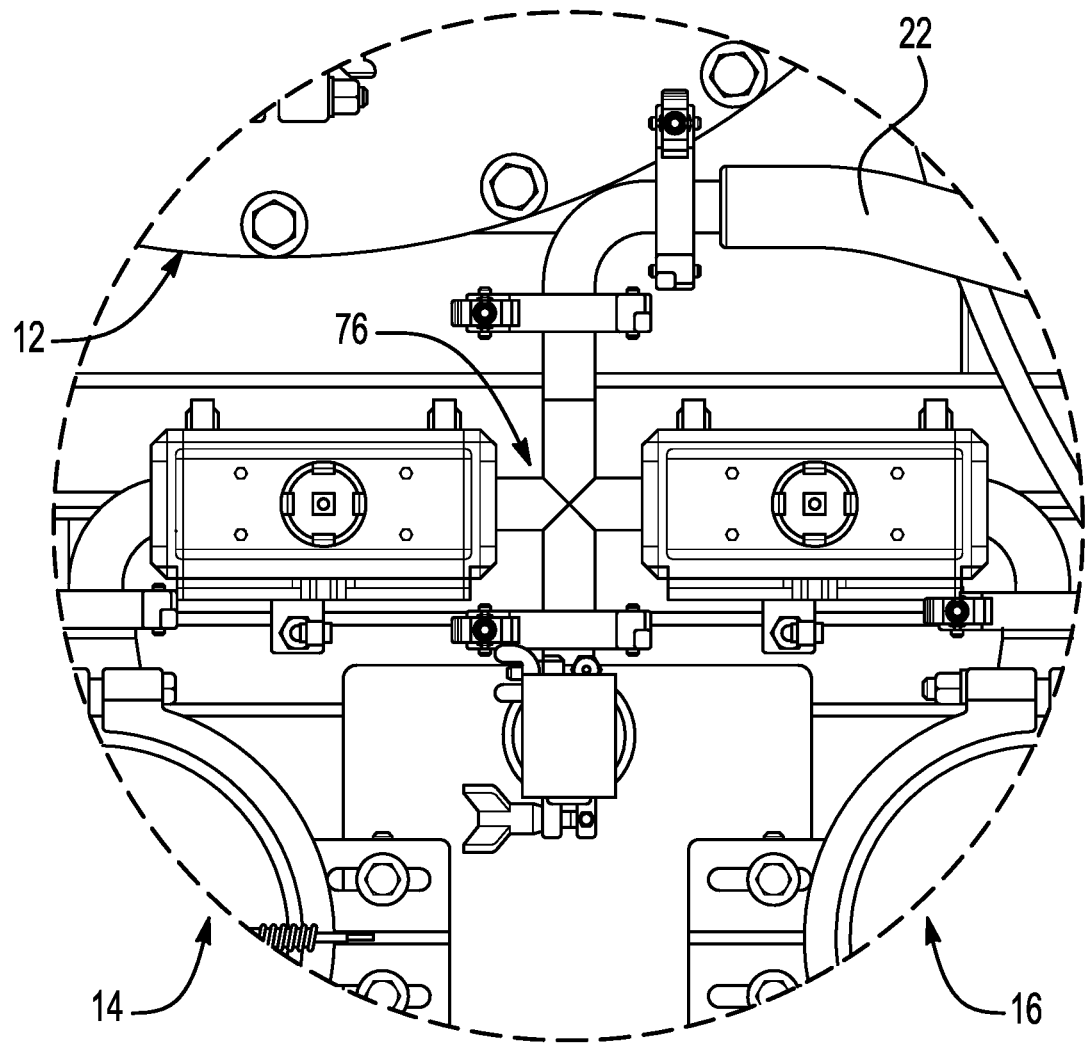
FIG. 6 is an enlarged view of a conveyance intersection of the terpene extraction system.
Figure 7:
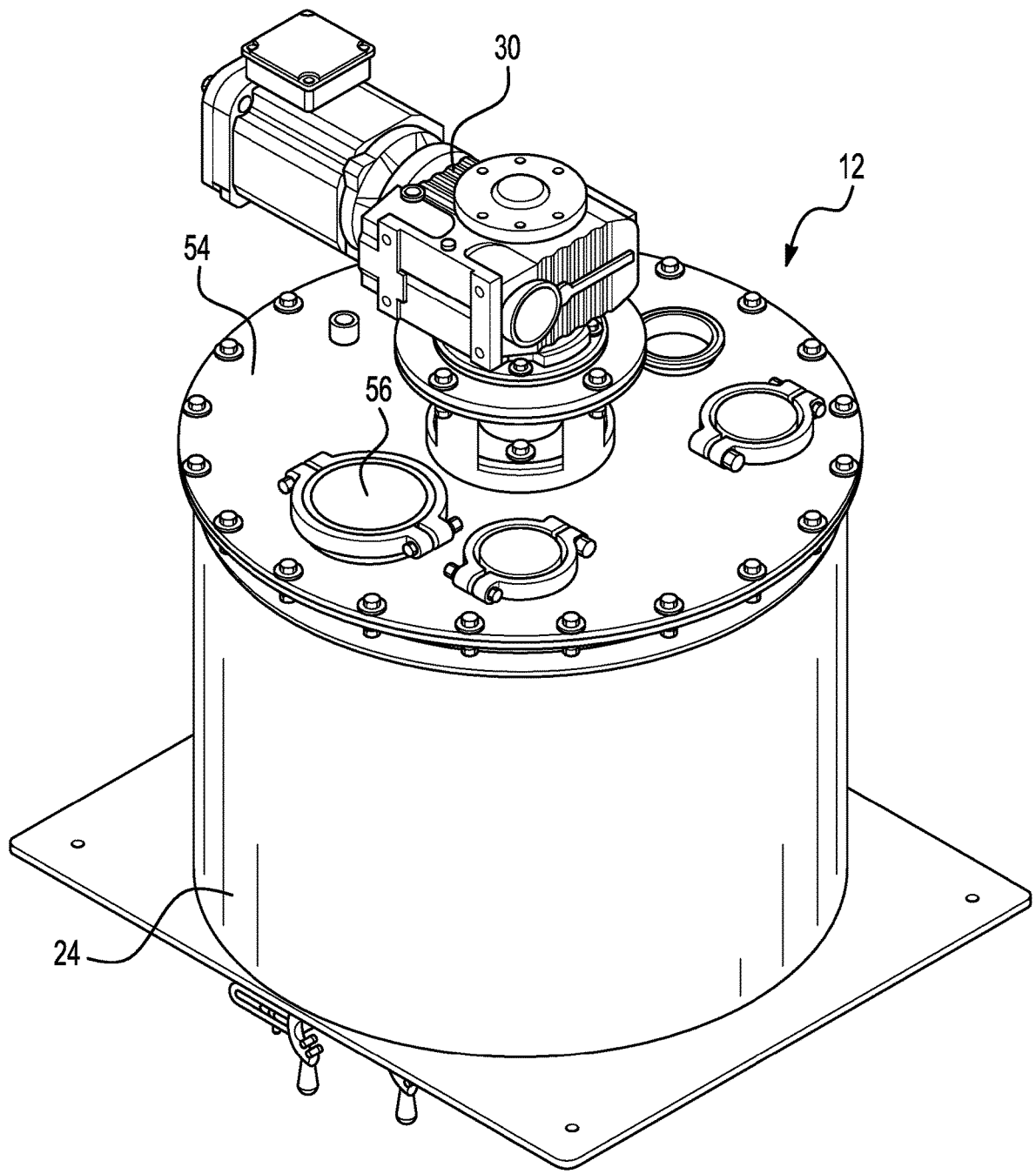
FIG. 7 is a perspective view of an embodiment of a reactor assembly of the terpene extraction system.
Figure 8:
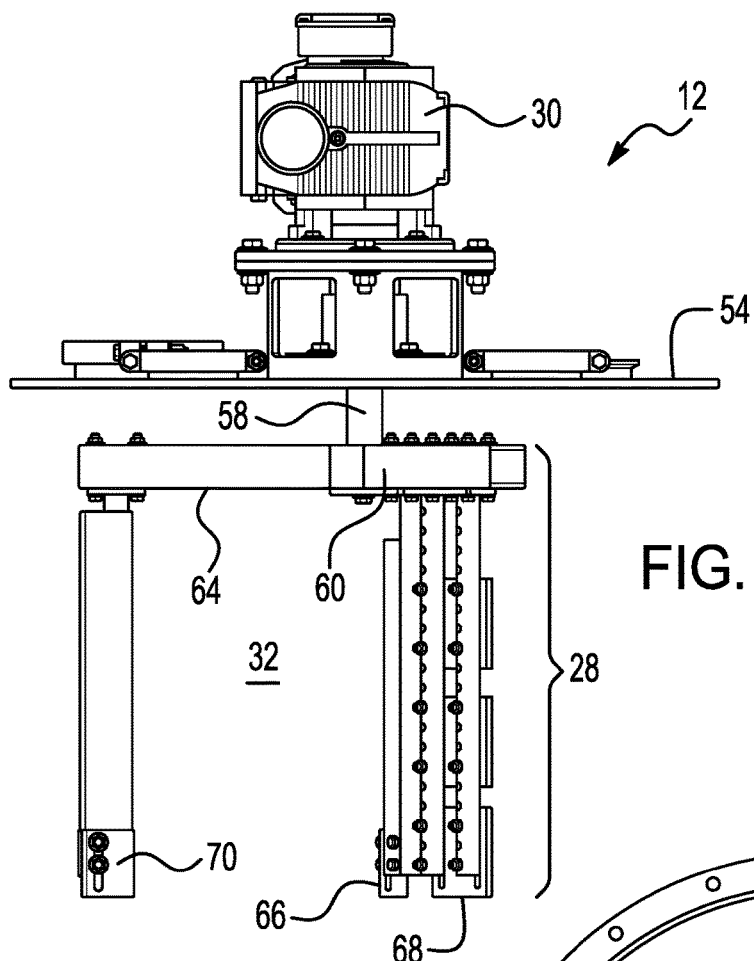
FIG. 8 is a side view of the reactor assembly, displaying internal components thereof.
Figure 9:
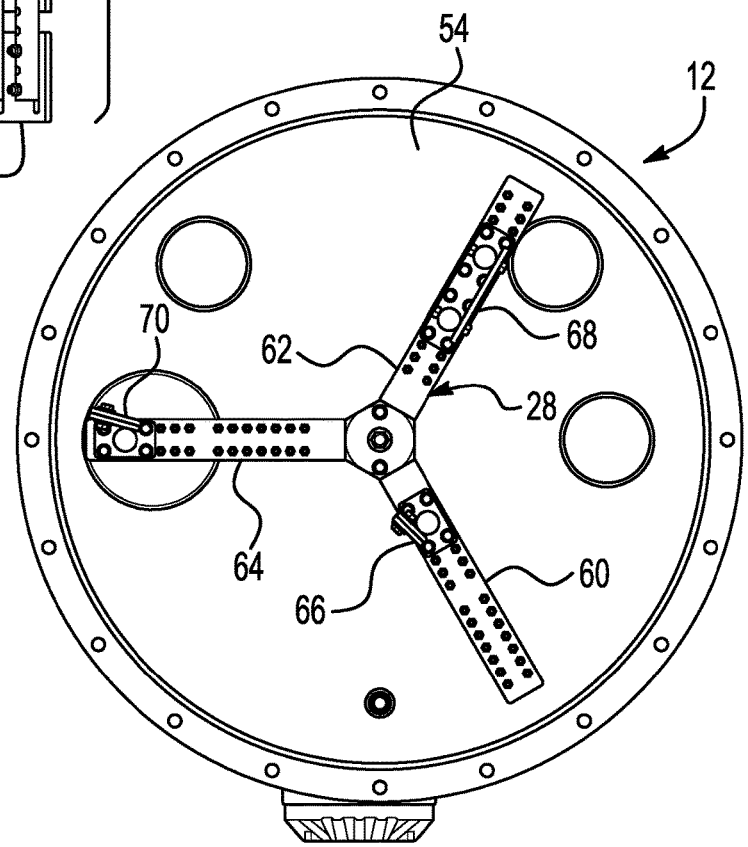
FIG. 9 is a bottom view of the internal components of the reactor assembly.
Figure 10:
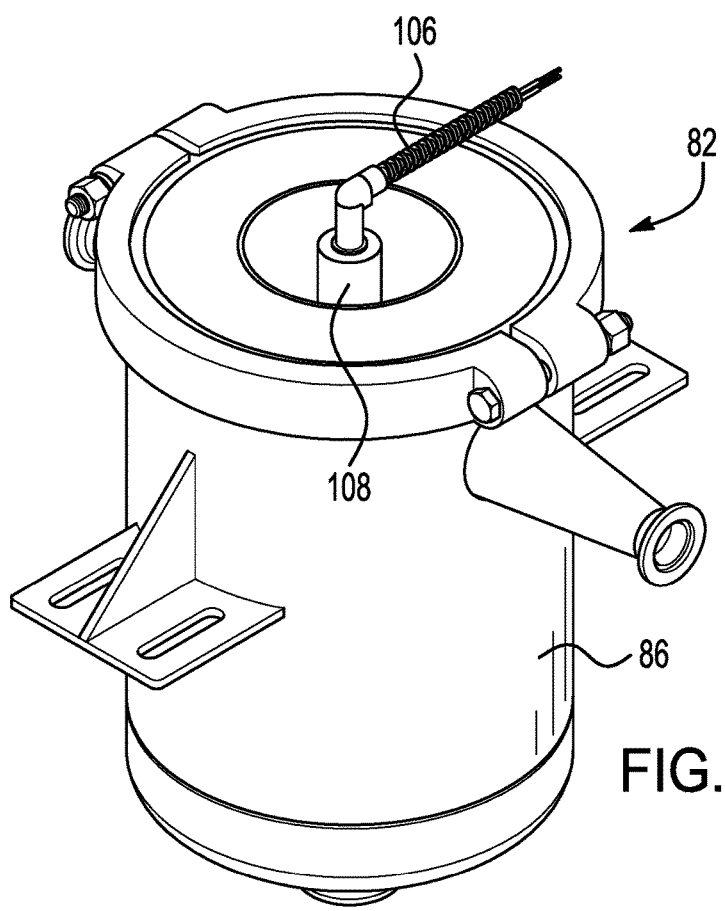
FIG. 10 is a perspective view of an embodiment of a primary cold trap of the terpene extraction system.

Referring particularly to FIGS. 7-9, the reactor assembly 12 according to this embodiment has a housing 24, a heater 26, an agitator 28, and a motor 30; still, in other embodiments the reactor assembly could have more, less, and/or different components. The heater 26 can be a component of the larger terpene extraction system 10. The housing 24 accepts reception and loading of the plant biomass in discrete batches. In an example, the plant biomass can fill approximately one-half of a total volume of an interior 32 of the housing 24. The housing 24 has a generally cylindrical shape with a main axis of the cylindrical shape arranged in a vertical direction, establishing an overall vertical orientation. The interior 32 is established by an outer wall construction 34 (FIG. 5). The outer wall construction 34 can have a jacketed construction formation, and can be composed of multiple walls spaced from one another for insulation and heating purposes. Referring to FIG. 5, a first outer wall 36 and a second outer wall 38 are spaced from each other, establishing an outer through-passage 40 therebetween. Fluid heated by the heater 26 can be pumped and circulated through the outer through-passage 40 in order to increase the temperature of the interior 32 and thereby heat the plant biomass residing in the interior 32. The fluid can be water according to an example. The heater 26 can interact with the housing 24 in various manners, depending on the embodiment, including by fluidly communicating with the outer through-passage 40 via tubing, piping, hosing, and/or fittings. The fluid can be heated within a range of approximately fifty degrees Celsius (50° C.) and one-hundred degrees Celsius (100° C.); still, in other examples the temperature can vary in value depending upon the particular plant biomass subject to terpene extraction. The heater 26 can be an immersion type heater, and a pump can be connected to the heater 26 and fluidly communicate therewith in order to move the heated fluid for circulation. In the embodiment here, the heater 26 is mounted at the frame assembly 18 a short distance from the housing 24. An additional outermost wall provides a spacing for insulation from the first and second outer walls 36, 38 and the heated fluid therebetween. A similar jacketed construction formation can be provided at a bottom wall construction 42 of the housing 24. Likewise, a jacketed construction formation can be provided at a wall construction 44 of a central hub 46. The central hub 46 is situated interiorly with respect to the first and second outer walls 36, 38. The central hub's wall construction 44 can be composed of a first inner wall 48 and a second inner wall 50. As before, an inner through-passage 52 is established between the first and second inner walls 48, 50.

The outer wall construction 34, bottom wall construction 42, and central hub wall construction 44 can fluidly communicate with one another. By these constructions and fluid communications, fluid heated by the heater 26 can be circulated simultaneously at the outer wall construction 34, at the bottom wall construction 42, and at the central hub wall construction 44. The plant biomass loaded in the housing 24 is hence heated effectively and efficiently from multiple directions and with increased surface area. In an example, the temperature of the interior 32 can be brought to and maintained within a range of approximately fifty degrees Celsius (50° C.) and one-hundred degrees Celsius (100° C.); still, in other examples the temperature can vary in value depending upon the particular plant biomass subject to terpene extraction. Furthermore, and referring now to FIG. 7, the housing 24 has a lid 54 that can be bolted in place. The lid 54 sits atop the cylindrical body of the housing 24. One or more doors 56 can be provided in the lid 54 for opening and loading the plant biomass in the housing 24, and then subsequently closing. To empty the housing 24 of plant biomass once processing is completed at the reactor assembly 12, a discharge door can be provided at a bottom side of the housing 24.

The agitator 28 gently stirs and mixes the plant biomass inside the housing 24 to more evenly distribute the heat generated via the circulated heated fluid to the plant biomass. With reference now to FIGS. 8 and 9, the agitator 28 has a shaft 58, a first arm 60, a second arm 62, a third arm 64, a first paddle 66, a second paddle 68, and a third paddle 70. The shaft 58 is connected to the motor 30. The first, second, and third arms 60, 62, 64 can extend from the shaft 58 for rotation therewith. The paddles 66, 68, 70 can be composed of a stainless steel material. The first paddle 66 is mounted to the first arm 60 and extends downward from the first arm 60 via an extension for suspension within the housing's interior 32. The first paddle 66 has a radially-inward position relative to the second and third paddles 68, 70. By its location, the first paddle 66 serves as an inner paddle. As shown in FIG. 9, the first paddle 66 is angled with respect to a radius of the circular shape of the housing 24. The angle of the first paddle 66 incites movement of the plant biomass outwardly and toward the outer wall construction 34. The second paddle 68 is mounted to the second arm 62 and extends downward from the second arm 62 via an extension for suspension within the housing's interior 32. The second paddle 68 has a radially-middle position relative to the first and third paddles 66, 70. By its location, the second paddle 68 serves as a middle paddle. As shown in FIG. 9, the second paddle 68 is oriented in-line with respect to the housing's radius.

Lastly, and in a similar way, the third paddle 70 is mounted to the third arm 64 and extends downward from the third arm 64 via an extension for suspension within the housing's interior 32. The third paddle 70 has a radially-outward position relative to the first and second paddles 66, 68. By its location, the third paddle 70 serves as an outer paddle. As shown in FIG. 9, the third paddle 70 is angled with respect to a radius of the circular shape of the housing 24. The angle of the third paddle 70 is in contrast to that of the first paddle 66 and incites movement of the plant biomass inwardly and away from the outer wall construction 34. Together, the angles and orientations of the first, second, and third paddles 66, 68, 70 work to keep the plant biomass steadily stirred and circulating in the housing's interior 32. Still, in other embodiments, the agitator could have a different design and construction of arms and extensions, and could have a different number of paddles than set forth herein.

The motor 30 drives rotational movement of the agitator 28 and its arms 60, 62, 64 and its paddles 66, 68, 70 about the shaft 58. The motor 30 drives the shaft 58 to spin about its axis. The motor 30 is mounted at an exterior of the housing 24 and atop the lid 54. In an example, the motor 30 could be a gearmotor of the variable speed drive (VSD) type, and could output two horsepower (2 hp) and twenty-eight revolutions per minute (28 RPM); still, other types of motors exhibiting other outputs could be implemented in other embodiments.

Figure 3:
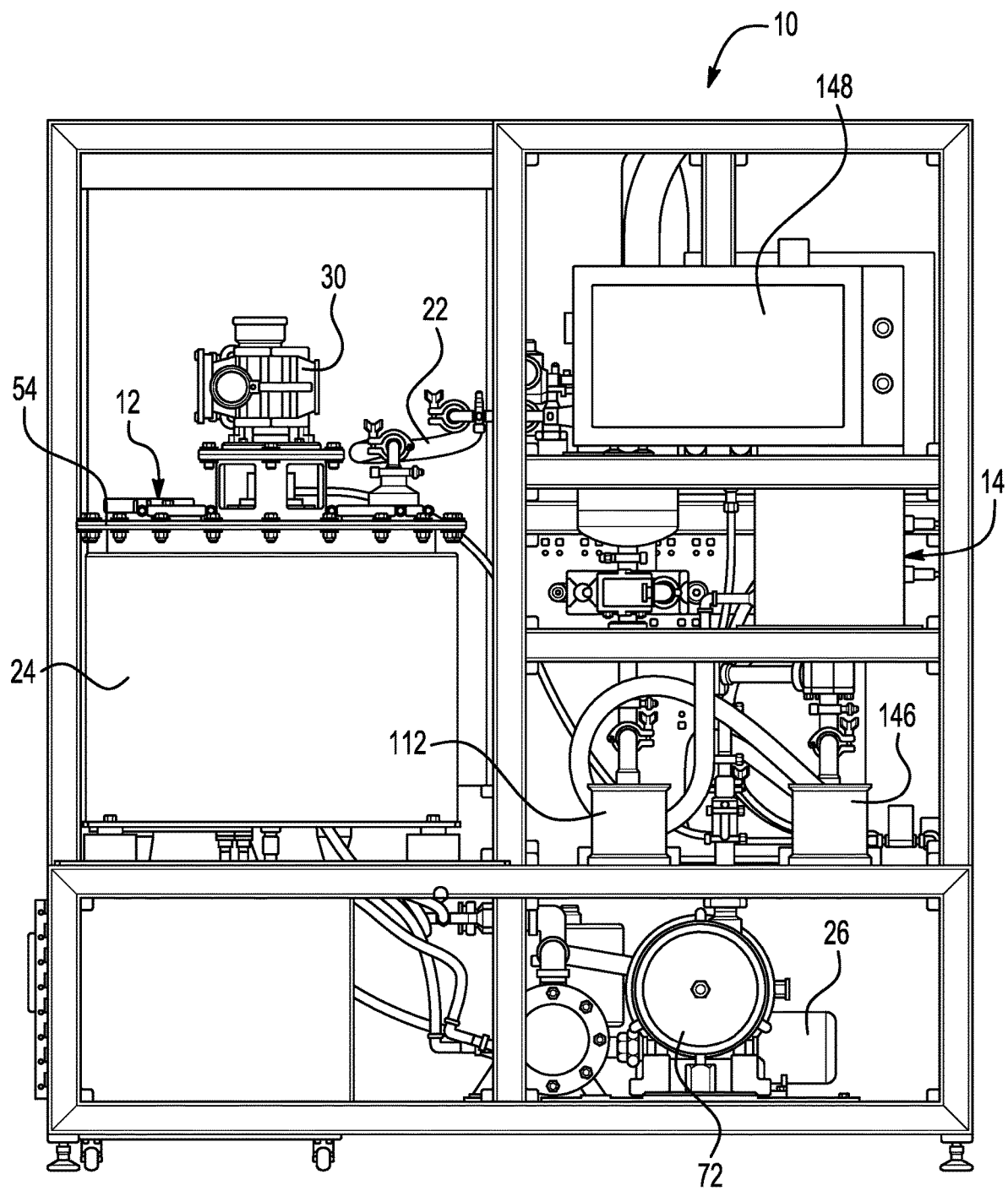
FIG. 3 is a front view of the terpene extraction system.
Figure 4:
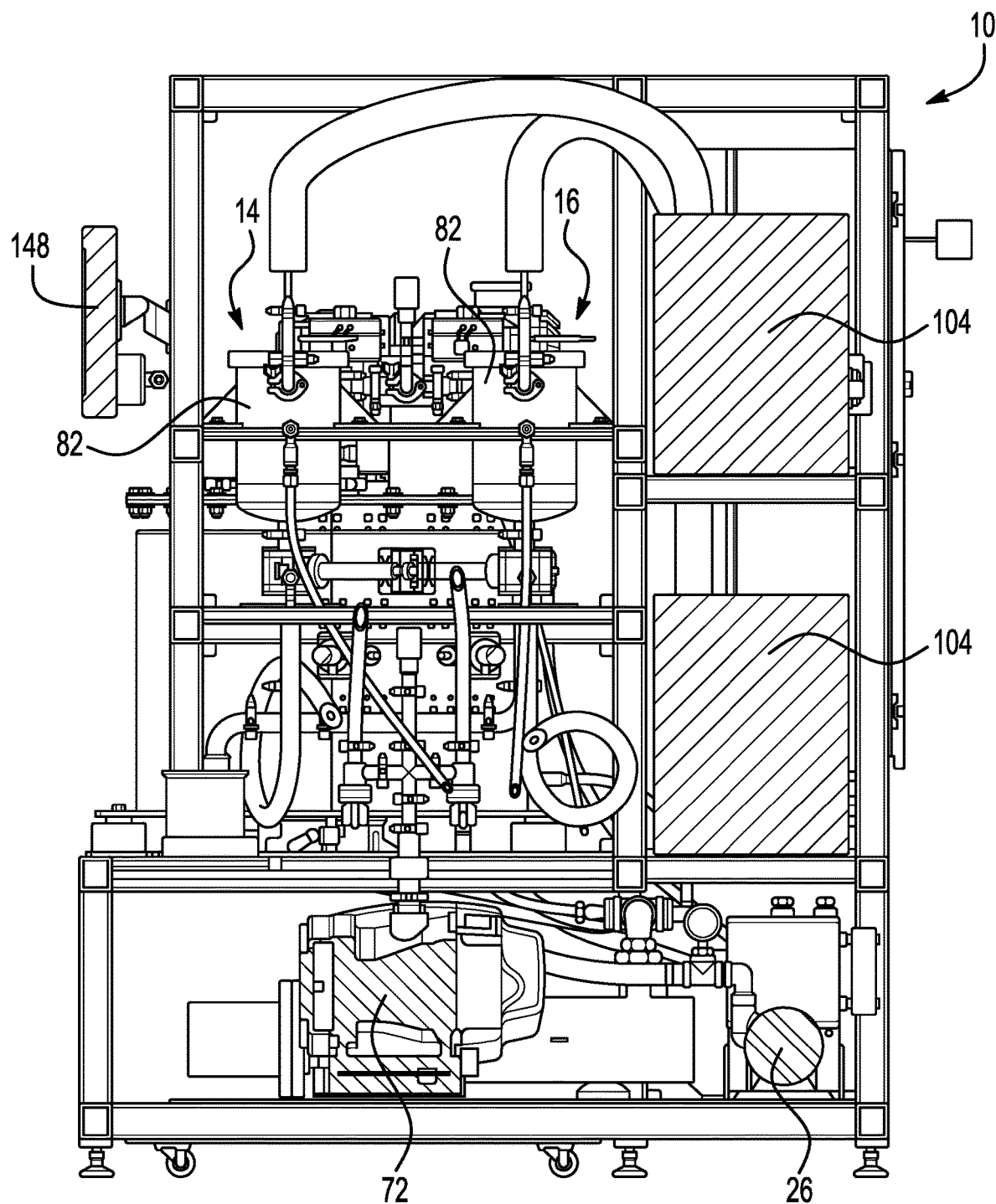
FIG. 4 is a sectional view of the terpene extraction system.

With reference now to FIGS. 3-5, in order to reduce the pressure within the reactor assembly 12 during vaporization of the plant biomass, a vacuum pump 72 is provided. The vacuum pump 72 can have communication with the housing's interior 32 via tubing, piping, hosing, and/or fittings. The vacuum pump 72 can also communicate via tubing, piping, hosing, and/or fittings with the first and second sets of cold traps 14, 16 in order to induce a pressure reduction thereat as well, and consequently move water and terpene vapor mixture through the first and second sets of cold traps 14, 16. Applying a vacuum condition to the reactor 12 effects a reduction in the evaporation point of the terpenes in the plant biomass subject to extraction, which in turn permits a decreased degree in the heat demanded at the interior 32. It has been shown that increased heat amid terpene extraction can cause harm to the terpenes. In an example, the pressure within the reactor assembly 12 is reduced to approximately 5 to 1,000 microns; still, other reduction values could be implemented in other embodiments. Furthermore, in an example, the vacuum pump could be provided by the Edwards company of Burgess Hill, England, under model number 35 cie; still, other types of pumps and other models from other companies could be implemented in other embodiments.

In an example of use, the plant biomass is processed by the reactor assembly 12 for a duration that can range between approximately sixty (60) minutes and two-hundred-and-forty (240) minutes; still, in other examples the duration can vary in value depending on the quantity of plant biomass and the particular plant biomass subject to terpene extraction. The resultant water and terpene vapor mixture is transferred downstream from the reactor assembly 12 to the first and second sets of cold traps 14, 16 via a sweeping or purging of the housing's interior 32. In one example, an inert gas is used to sweep the interior 32 of water and terpene vapor mixture. Nitrogen can be utilized as the sweeping agent. A sweep valve 74 (FIG. 17) is opened in order to initiate sweeping and permit entry and flow of the inert gas to the interior 32 from a supply. The sweep valve 74 can be of the solenoid valve type. In an example, the duration of opening of the sweep valve 74 can range between approximately 1 and 15 seconds; still, in other examples the duration can vary.

Figure 17:
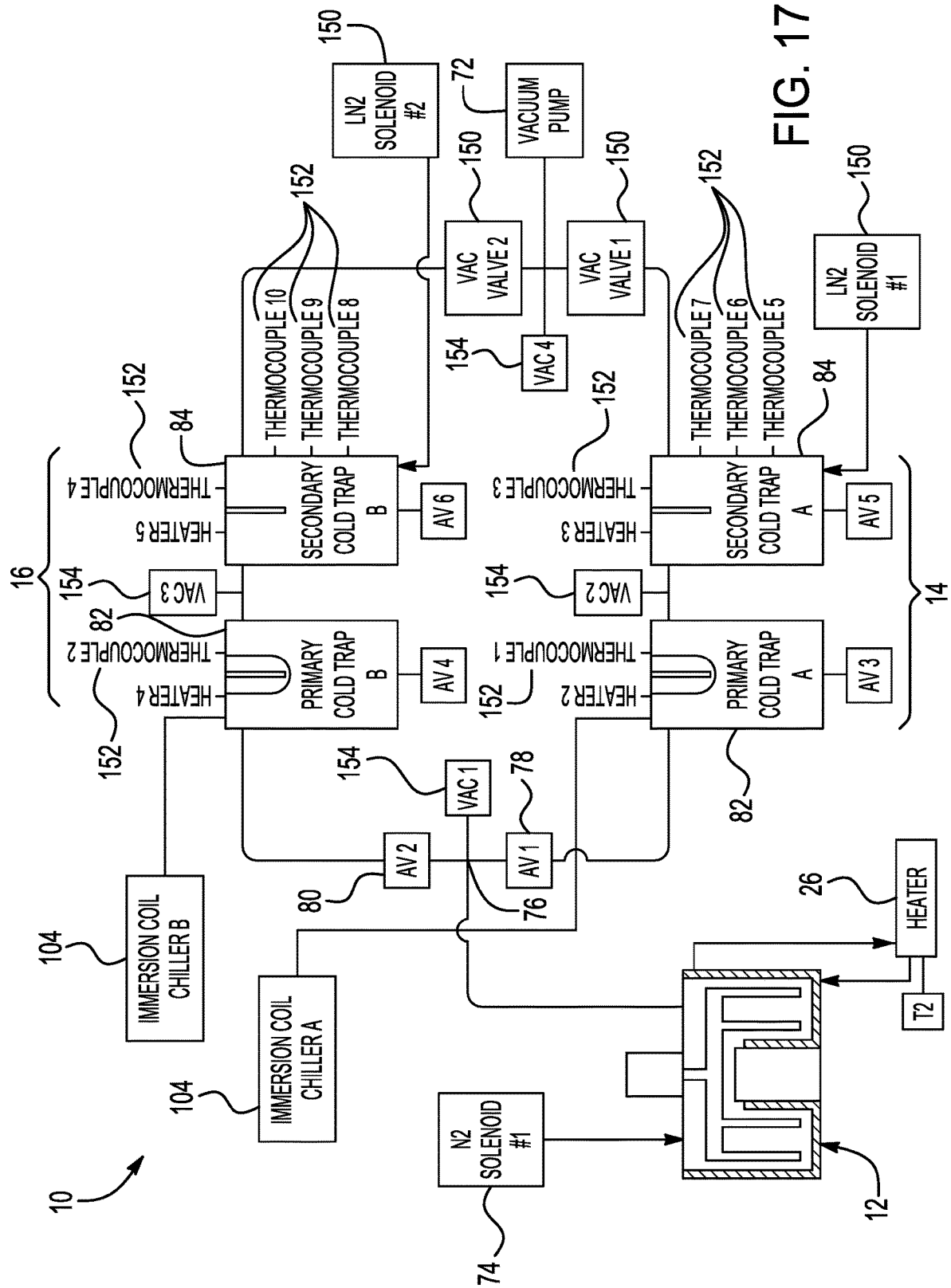
FIG. 17 is a diagrammatic layout of the terpene extraction system.
Figure 18:
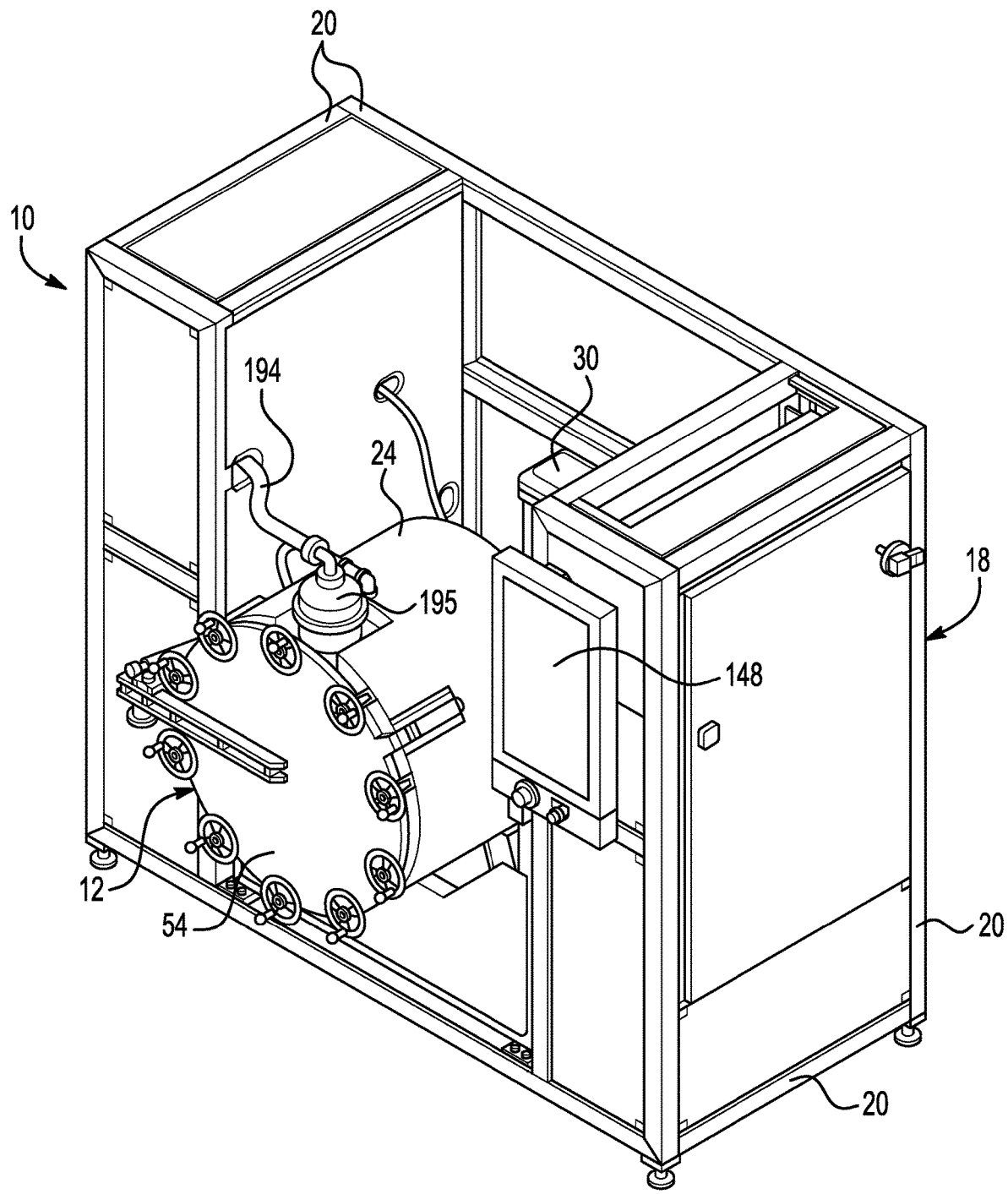
FIG. 18 is a perspective view of a second embodiment of a terpene extraction machine and system.

The first and second sets of cold traps 14, 16 serve to capture water and terpene from the water and terpene vapor mixture produced upstream via the reactor assembly 12 and transferred thereto. The water and terpene vapor mixture is condensed at the first and second sets of cold traps 14, 16, and resulting water and terpene is frozen in the first and second sets of cold traps 14, 16. The frozen water and terpene can then be thawed in the first and second sets of cold traps 14, 16. In this embodiment, the first and second sets of cold traps 14, 16 have a parallel arrangement with respect to each other for independent use amid operation of the terpene extraction system 10. The parallel arrangement provides the ability of the terpene extraction system 10 to operate in a largely continuous manner—for instance, as the first set of cold traps 14 is working, the reactor assembly 12 can concurrently initiate vaporization of a discrete and fresh batch of plant biomass and, when ready, transfer the resulting water and terpene vapor mixture of the discrete batch to the second set of cold traps 16. The initiation of vaporization need not wait until the first set of cold traps 14 has completed its cycle of working. Whether the water and terpene vapor mixture is transferred to the first set of cold traps 14 or, on the other hand, to the second set of cold traps 16 is dictated by valve openings and closings at a conveyance intersection 76 (FIG. 6) situated downstream of the reactor assembly 12 and upstream of the first and second sets of cold traps 14, 16. With reference to FIG. 17, a first valve 78 and a second valve 80 can be equipped at the conveyance intersection 76. The first and second valves 78, 80 can be of the pneumatic valve type. Still, in other embodiments, the terpene extraction system could have a single set of cold traps instead of a pair of sets, or could have more than a pair of sets in parallel.

With reference to FIGS. 2, 4, and 5, each of the first and second sets of cold traps 14, 16 includes a primary cold trap 82 and a secondary cold trap 84 according to this embodiment. The primary cold trap 82 of the first set of cold traps 14 can be similar to that of the second set of cold traps 16; likewise, the secondary cold trap 84 of the first set of cold traps 14 can be similar to that of the second set of cold traps 16. Relative to each other, the first set of cold traps 14 has a first primary cold trap 82 and a first secondary cold trap 84, and the second set of cold traps 16 has a second primary cold trap 82 and a second secondary cold trap 84. The first primary and secondary cold traps 82, 84 have a series arrangement with respect to each other, and the second primary and secondary cold traps 82, 84 also have a series arrangement with respect to each other. The series arrangement has been found to facilitate the maximization of the amount of terpenes extracted from a particular batch of plant biomass. For instance, in some cases the primary cold trap 82 captures frozen water and terpenes from the water and terpene vapor mixture in an amount up to approximately sixty percent (60%) of the total water and terpene contained in the vapor mixture, or a majority thereof, while the secondary cold trap 84 captures the remaining amount of approximately forty percent (40%) of the total; still, these amounts and percentages can vary in other examples. The primary cold trap 82 is situated immediately downstream of the reactor assembly 12, and the secondary cold trap 84 is situated immediately downstream of the primary cold trap 82. The primary cold trap 82 fluidly communicates with the reactor assembly 12, and likewise fluidly communicates with the secondary cold trap 84.

Figure 11:
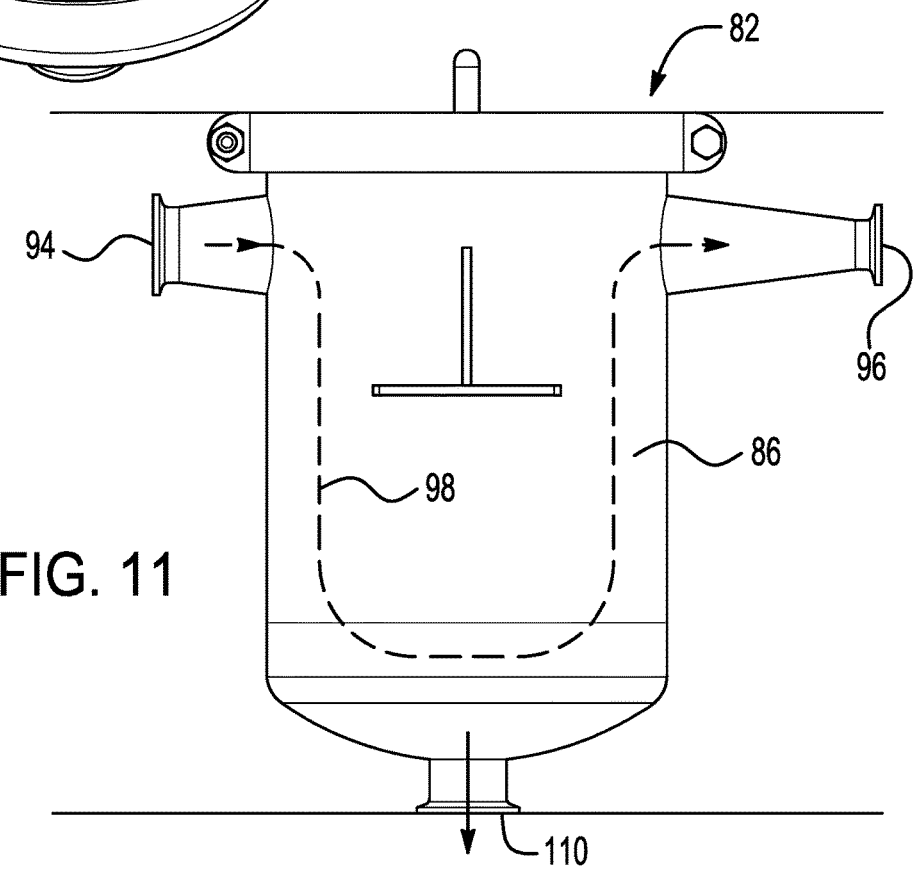
FIG. 11 is a side view of the primary cold trap.
Figure 12:
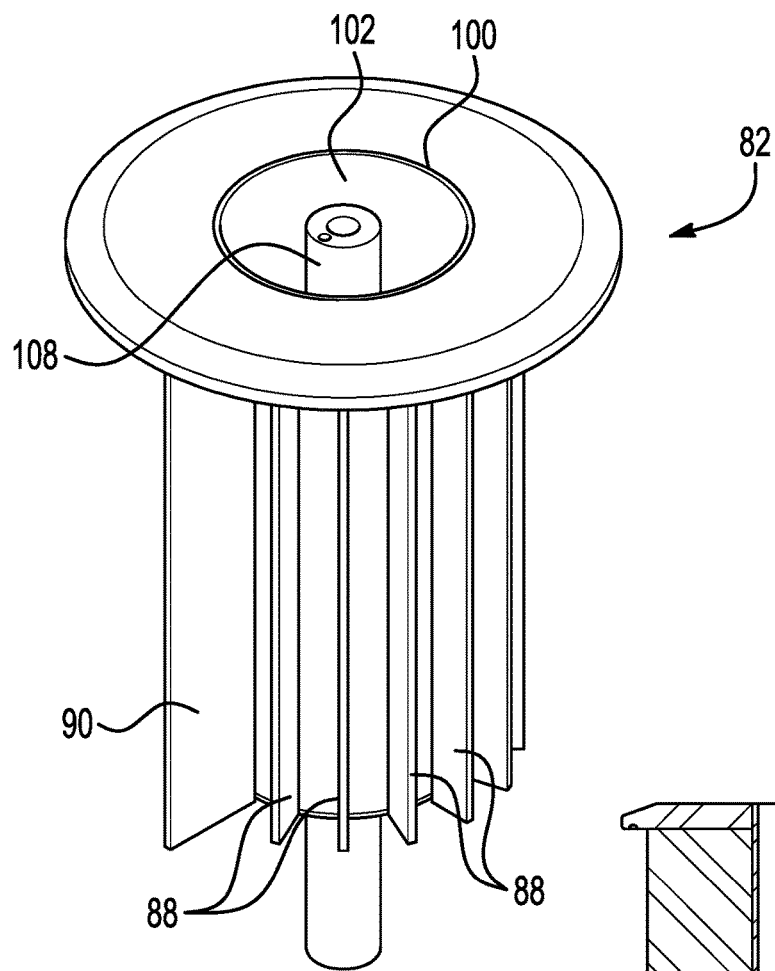
FIG. 12 is a perspective view of the primary cold trap, displaying internal components thereof.
Figure 13:
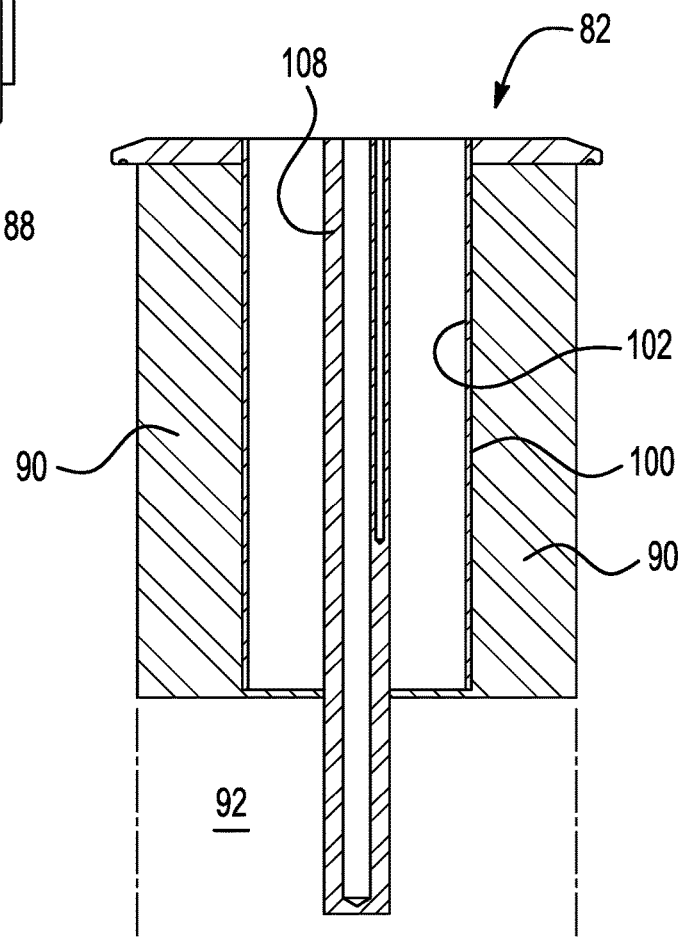
FIG. 13 is a sectional view of the internal components of the primary cold trap.
Figure 14:
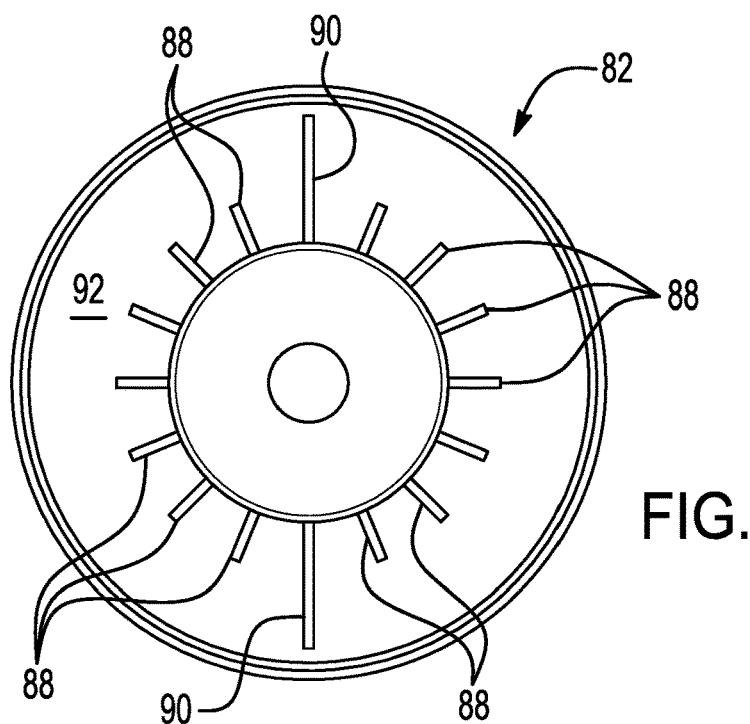
FIG. 14 is a bottom view of the internal components of the primary cold trap.

The primary cold trap 82 can have different designs, constructions, and components in various embodiments. In the embodiment of FIGS. 10-14, the primary cold trap 82 is of the Dewar type. In general, the primary cold trap 82 has a housing 86, a set of fins 88, and a partition wall 90. The housing 86 establishes an interior 92 through which water and terpene vapor mixture flows amid use of the primary cold trap 82. An inlet 94 receives entry of the water and terpene vapor mixture into the primary cold trap 82 and into the interior 92. The water and terpene vapor mixture received at the inlet 94 comes from the reactor assembly 12. Opposite the inlet 94, an outlet 96 allows exit of the remaining water and terpene vapor mixture that makes its way through the primary cold trap 82 without capture. Water and terpene vapor mixture exiting the primary cold trap 82 travels downstream to the secondary cold trap 84. Between the inlet 94 and outlet 96, the water and terpene vapor mixture travels downward and around the set of fins 88. The partition wall 90 extends wholly across the interior 92 in a cross-wise direction to the sides of the housing 86, but stops short of the housing's bottom wall. The partition wall 90 hence causes a somewhat circuitous path of the water and terpene vapor mixture traveling through the interior 92, and physically obstructs a more direct path. The path of water and terpene vapor mixture is represented in FIG. 11 by a broken line 98. The water and terpene vapor mixture has increased exposure to the set of fins 88 due to the path forced upon it via the partition wall 90. The set of fins 88 provide increased surface area to effect condensation and freezing.

Furthermore, the primary cold trap 82 has a thimble-like construction 100 provided in its structure. The thimble 100 establishes a cavity 102. The cavity 102 receives insertion of an immersion coil (not depicted) in full assembly and installation. The immersion coil is seated in the cavity 102. Coolant fluid is contained in the cavity 102 and submerges the immersion coil. The immersion coil is cooled by an immersion coil chiller system 104 (FIG. 4), which in turn cools the coolant fluid and causes cooling of the set of fins 88. The temperature in the primary cold trap 82 can range between approximately negative eighty degrees Celsius (−80° C.) and negative one-hundred degrees Celsius (−100° C.) when activated during use; still, in other examples the temperature at the primary cold trap 82 can vary in value. In an example, the immersion coil chiller system could be a low temperature cooler with the model number IP-100 or IP-80 provided by PolyScience of Niles, Illinois U.S.A.; still, other types of chiller systems and other types of models from other companies could be implemented in other embodiments.

In order to expedite thawing of frozen water and terpenes captured in the primary cold trap 82, a heater 106 is integrated into the design and construction of the primary cold trap 82. The type of heater provided can dictate its particular integration into the primary cold trap 82. In this embodiment, the heater 106 is of the cartridge heater type. The heater 106 is located at a central region of the housing 86 and is inserted in a socket 108 of the primary cold trap 82. The socket 108 is disposed in the cavity 102 and extends therethrough. An exterior of the socket 108 is submerged in the coolant fluid contained in the cavity 102. During use of the primary cold trap 82, the heater 106 can be activated ON and deactivated OFF at desired setpoints and cycled times. The temperature of the heater 106, when activated, can range between approximately thirty degrees Celsius (30° C.) and sixty degrees Celsius (60° C.); still, in other examples the temperature of the heater can vary in value. Thawed water and terpenes in liquid form can exit the primary cold trap 82 via a collection outlet 110 (FIG. 11). A valve can be equipped adjacent the collection outlet 110 in order to control the opening and closing thereof. The valve can be of the pneumatic valve type. Downstream of the collection outlet 110, a collection can 112 (FIG. 3) can accept the thawed water and terpenes in liquid form. From there, the thawed water and terpenes can be poured into one or more separatory funnels. The separatory funnel(s) separates the water and terpenes in discrete layers, effectively isolating the extracted terpenes. The separatory funnel(s) can be a stand-alone device. Still, in other embodiments, thawing can be carried out in other ways.

Figure 15:
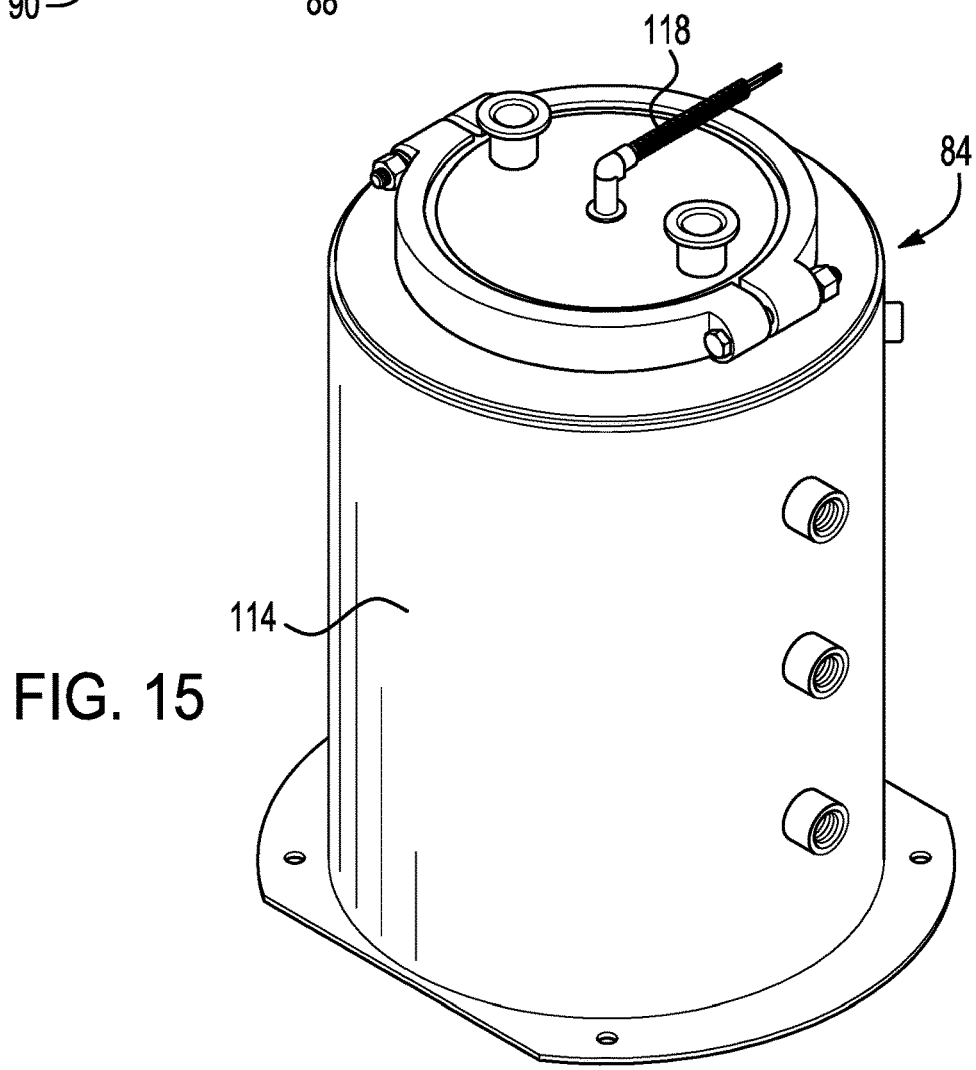
FIG. 15 is a perspective view of an embodiment of a secondary cold trap of the terpene extraction system.
Figure 16:
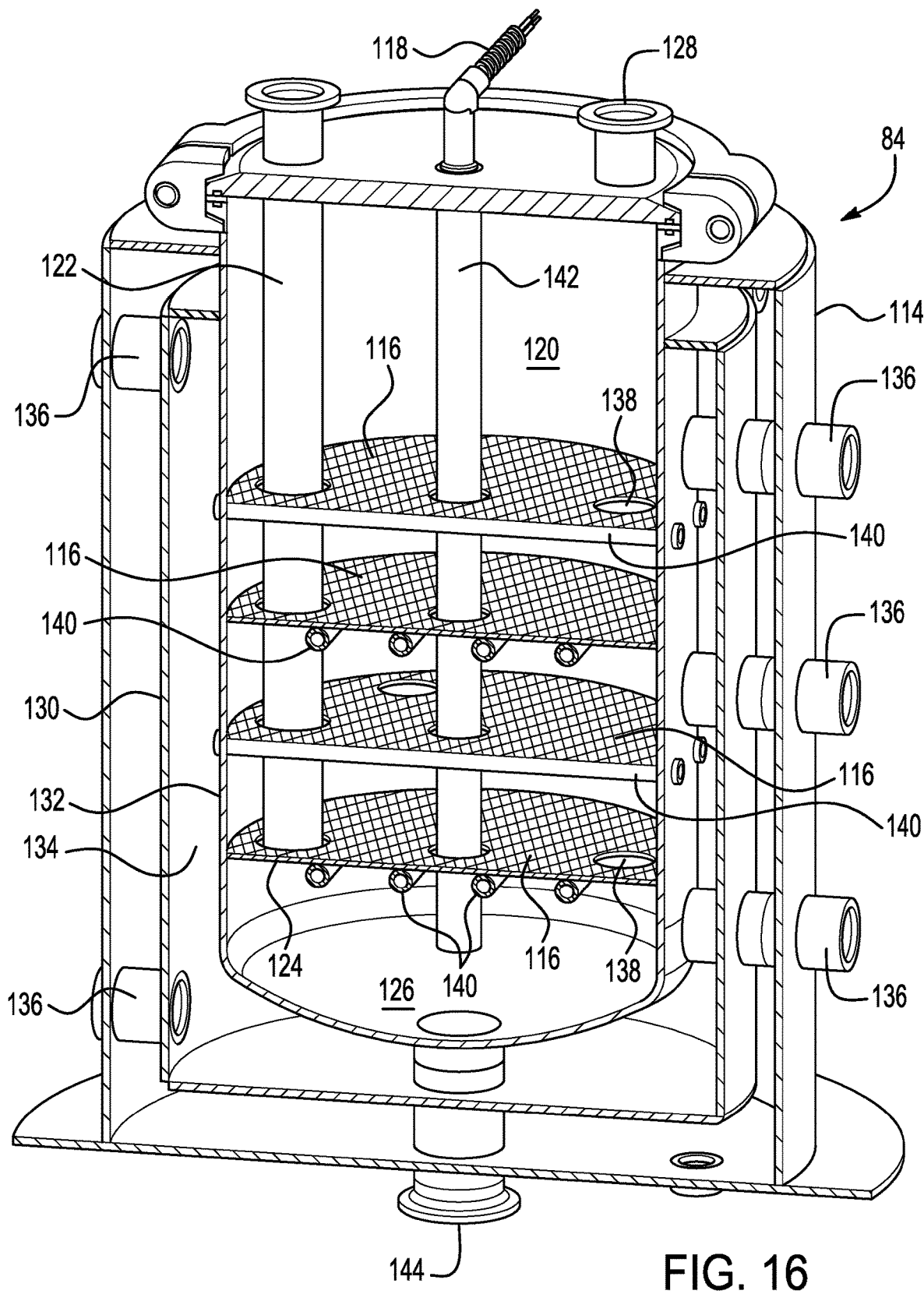
FIG. 16 is a sectional view of the secondary cold trap.

The secondary cold trap 84 can have different designs, constructions, and components in various embodiments. In the embodiment of FIGS. 15 and 16, the secondary cold trap 84 has a housing 114, multiple perforated plates 116, and a heater 118. The housing 114 establishes an interior 120 through which remaining water and terpene vapor mixture flows amid use of the secondary cold trap 84. An inlet tube 122 receives remaining water and terpene vapor mixture from the primary cold trap 82 and leads it into the interior 120. The inlet tube 122 extends through the interior 120 and presents its open end 124 at a bottom region 126 of the interior 120. Remaining water and terpene vapor mixture is thereby deposited at the bottom region 126, where it is initially located beneath the perforated plates 116. Opposite the bottom region 126 and located at an upper region, an outlet 128 provides an exit. Between the inlet's open end 124 and the outlet 128, the remaining water and terpene vapor mixture travels upward and through the perforated plates 116. The housing 114 has a jacketed wall construction made-up of multiple walls for insulation and cooling purposes. A first outer wall 130 and a second outer wall 132 are spaced from each other, establishing a coolant through-passage 134 therebetween. An additional outermost wall provides a spacing for insulation from the first and second outer walls 130, 132 and coolant therebetween. Coolant can be pumped and circulated through the coolant through-passage 134 via tubes 136 in order to decrease the temperature of the interior 120. In an example, the coolant is liquid nitrogen ($LN_2$); still, the coolant could be something else in other examples.

The perforated plates 116 are stacked laterally across the housing's interior 120. In the embodiment of FIG. 16, there are four in total, but there could be other quantities in other embodiments. Each perforated plate 116 has numerous perforations defined in its structure for the attempted passage of remaining water and terpene vapor mixture. Further, one or more escape openings 138 can reside in the structure of each perforated plate 116 in the event that its perforations become clogged amid use with frozen water and terpenes. To provide cooling to the perforated plates 116, coolant tubes 140 are routed beneath each perforated plate 116. The coolant tubes 140 are in direct surface-to-surface abutment with the perforated plates 116. Coolant can be pumped and circulated through the coolant tubes 140. In an example, the coolant is liquid nitrogen ($LN_2$); still, the coolant could be something else in other examples. The temperature in the secondary cold trap 84 can range between approximately negative one-hundred-and-sixty degrees Celsius (−160° C.) and negative one-hundred-and-eighty degrees Celsius (−180° C.) when activated during use; still, in other examples the temperature at the secondary cold trap 84 can vary in value.

In order to expedite thawing of frozen water and terpenes captured in the secondary cold trap 84, the heater 118 is integrated into the design and construction of the secondary cold trap 84. The type of heater provided can dictate its particular integration into the secondary cold trap 84. In this embodiment, the heater 118 is of the cartridge heater type. The heater 118 is located at a central region of the housing 114 and is inserted in a socket 142 of the secondary cold trap 84. The socket 142 is disposed in the interior 120 and extends therethrough. An exterior of the socket 142 can make abutment with the perforated plates 116. During use of the secondary cold trap 84, the heater 118 can be activated ON and deactivated OFF at desired setpoints and cycled times. The temperature of the heater 118, when activated, can range between approximately thirty degrees Celsius (30° C.) and sixty degrees Celsius (60° C.); still, in other examples the temperature of the heater can vary in value. Thawed water and terpenes in liquid form can exit the secondary cold trap 84 via a collection outlet 144. A valve can be equipped adjacent the collection outlet 144 in order to control the opening and closing thereof. The valve can be of the pneumatic valve type. Downstream of the collection outlet 144, a collection can 146 (FIG. 3) can accept the thawed water and terpenes in liquid form. From there, the thawed water and terpenes can be poured into the separatory funnel(s) previously described. Still, in other embodiments, thawing can be carried out in other ways.

Furthermore, in other embodiments, the primary cold trap 82 could have the designs, constructions, and components shown and described in relation to the secondary cold trap 84, while the secondary cold trap 84 could have the designs, constructions, and components shown and described in relation to the primary cold trap 82. In other words, the locations of the primary and secondary cold traps 82, 84 in the larger terpene extraction system 10 could be swapped with each other and substituted for each other. Yet further, in another embodiment, the terpene extraction system 10 could merely have a pair of primary cold traps arranged in parallel and in the absence of downstream secondary cold traps.

The terpene extraction system 10 can have additional components that assist and facilitate its functionality. For inputting parameters to the system and outputting operational data and information to an operator, a human-machine interface (HMI) 148 (FIGS. 1 and 3) is provided. In an example, the HMI 148 could be a touch screen panel monitor with the model number HIS-UM23-STTD provided by Hope Industrial Systems, Inc. of Roswell, Georgia U.S.A.; still, other types of HMIs and other types of monitors and models from other companies could be implemented in other embodiments. With particular reference to FIG. 17, a multitude of valves 150 are equipped at various locations in the terpene extraction system 10. The valves 150 open and close to permit and prevent fluid-flow thereat, as commanded by a controller (set forth below). Differing types of valves can be provided, including of the solenoid type, of the pneumatic type, or some other type. Further, a multitude of thermocouples 152 are deployed at various locations in the terpene extraction system 10. The thermocouples 152 take temperature measurements at their respective locations and output the readings to the controller. Lastly, a multitude of vacuum gauges 154 are deployed at various locations in the terpene extraction system 10. The vacuum gauges 154 take pressure measurements at their respective locations and output the readings to the controller.

The terpene extraction system 10 and its various operations can be automated and managed by a controller such as a programmable logic controller (PLC). The controller can receive and send inputs and outputs in the terpene extraction system 10. For instance, the controller can command the opening and closing actuations of the various valves, can activate and deactivate the heater 26 and the motor 30 and the vacuum pump 72, and can turn the heaters 106, 118 ON and OFF. In an example, the controller could be controller of the CompactLogix™ series, model L33, provided by Rockwell Automation, Inc. of Milwaukee, Wisconsin, U.S.A.; still, other types of controllers and other types of PLCs and models from other companies could be implemented in other embodiments.

According to an embodiment, a method of extracting terpenes from plant biomass can involve multiple steps. The method can vary in other embodiments, including having more, less, and/or different steps than those set forth here. Plant biomass is loaded into the interior 32 of the housing 24 via the lid 54 and its door(s) 56. Water heated by the heater 26 is circulated through the outer wall construction 34, through the bottom wall construction 42, and through the central hub wall construction 44. The temperature of the interior 32 is hence increased, as well as the temperature of the plant biomass residing therein. The motor 30 drives rotational movement of the agitator 28. The first, second, and third paddles 66, 68, 70 revolve within the interior 32 and steadily stir the plant biomass and maintain movement of the plant biomass. A vacuum is applied to the interior 32 via the vacuum pump 72. The temperature increase, stirring, and vacuum can be furnished concurrently and continuously amid batch processing and for a duration that can range between approximately sixty (60) minutes and two-hundred-and-forty (240) minutes, or one-hundred-and-twenty (120) minutes, per examples, depending on the size of the batch and the particular plant biomass. These conditions that are controlled and rendered at the interior 32—heat, stirring, and vacuum—have been found to efficiently and effectively cause vaporization and produce a water and terpene vapor mixture that ultimately yields terpenes possessing higher quality and higher purity levels. Moreover, the amount of terpenes yielded is maximized. Solvents commonly added in past procedures, such as carbon dioxide ($CO_2$), are not added amid vaporization in the method set forth herein involving the terpene extraction system 10. The degradation to the extracted terpenes that can be a consequence of added solvents is hence precluded. In this sense, the extracted terpenes are preserved. At the end of the processing at the reactor assembly 12, resultant water and terpene vapor mixture are then transferred downstream to one of the first or second sets of cold traps 14, 16. In the embodiment here, the transfer is effected via the sweeping or purging at the interior 32. Downstream, the water and terpene vapor mixture initially encounters and is initially received in the first primary cold trap 82 of the first set of cold traps 14, for example. At least some of the water and terpene vapor mixture is condensed, frozen, and captured at the first primary cold trap 82. Remaining water and terpene vapor mixture from the first primary cold trap 82 is subsequently received in the first secondary cold trap 84. At least more of the remaining water and terpene vapor mixture is condensed, frozen, and captured at the first secondary cold trap 84. The frozen water and terpenes is then thawed, collected, and separated.

Figure 24:
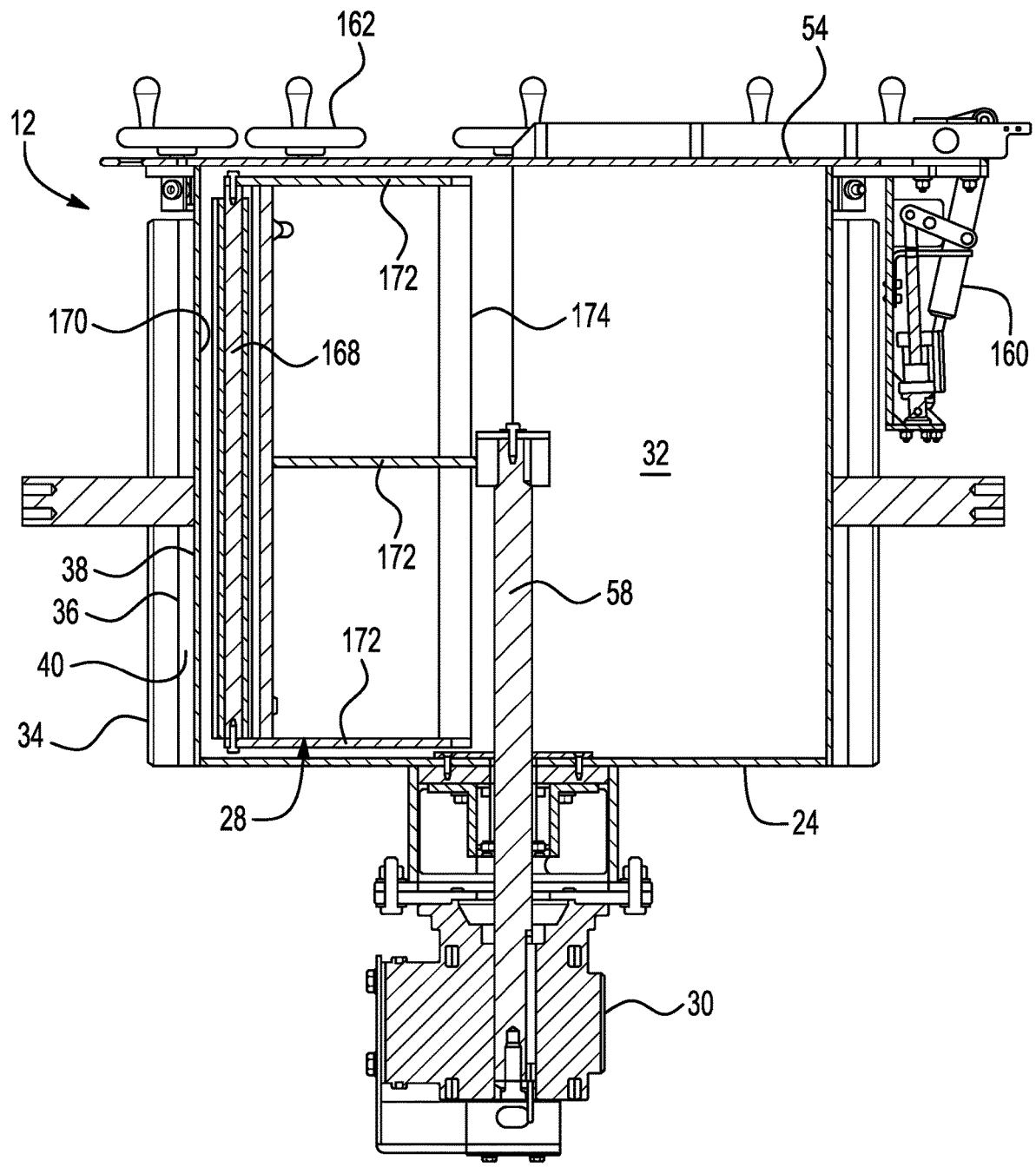
FIG. 24 is a sectional view of the reactor assembly of FIG. 23.
Figures 25, 26:
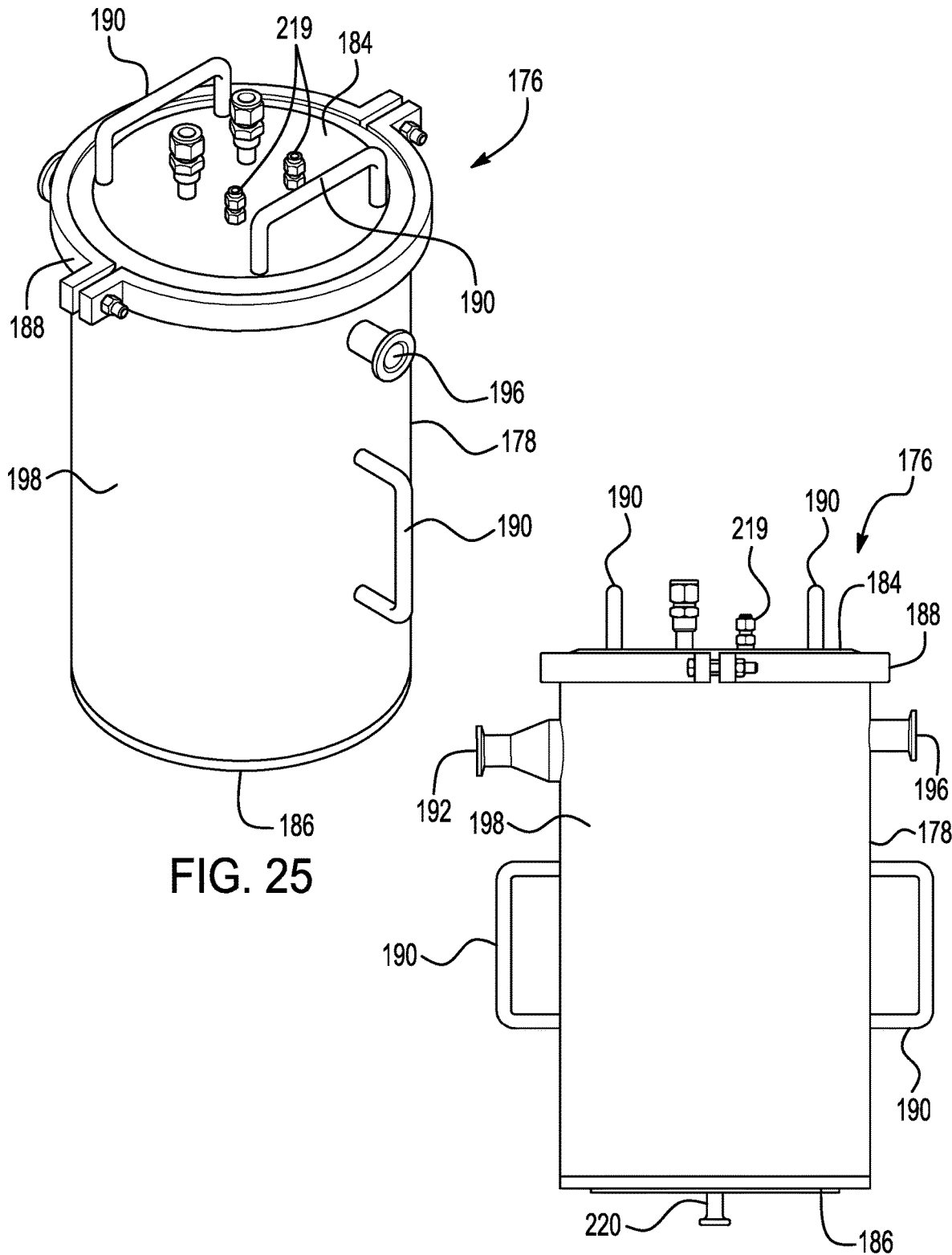
FIG. 25 is a perspective view of an embodiment of a cold trap that can be equipped in the second embodiment of the terpene extraction system.
FIG. 26 is a side view of the cold trap of FIG. 25.

A second embodiment of the terpene extraction system 10 is presented in FIGS. 18-29. Some components of the second embodiment are similar to, or the same as, components in the first embodiment, and those similarities may not be repeated here in the description of the second embodiment. Unlike the first embodiment, the housing 24 of this second embodiment exhibits an overall horizontal orientation. A main axis of the housing's cylindrical shape is arranged in a horizontal direction. This orientation has been found to facilitate reception and loading of the plant biomass in the housing's interior 32, as well as the exit and unloading procedure that follows. In an example, the interior 32 can accept a plant biomass batch size of up to twenty pounds (20 lbs.); still, other quantities may be possible in other examples. Further, and with particular reference to FIG. 22, in this embodiment a linear actuator 156 is provided and serves to tilt the housing 24 forward and downward to ease unloading of the plant biomass. In an example, the housing 24 is tilted approximately fifteen degrees (15°) from its normal horizontal orientation. The linear actuator 156 can be of the pneumatic type, and can include a cylinder, rod, and magnetic piston, among other components and as will be appreciated by skilled artisans. When commanded, the linear actuator 156 moves from a retracted state to an extended state. The linear actuator 156 can have a pivoted mounting 158 at a bottom and backside of the housing 24. As before, the interior 32 is established by the outer wall construction 34, as shown in FIG. 24. The outer wall construction 34 can have a jacketed construction formation, and can be composed of multiple walls spaced from one another for insulation and heating purposes. The first outer wall 36 and second outer wall 38 are spaced from each other and establish the outer through-passage 40 therebetween. The bottom wall and central hub wall constructions of the first embodiment can be absent in this second embodiment.

Another dissimilarity with the first embodiment is the lid 54 in this second embodiment. The lid 54 is depicted in a closed state in the figures, but can be swung to an open state about a pair of gas spring and damper mechanisms 160, shown best by FIG. 23. The lid 54 can open ninety degrees (90°) from its closed state, for example. Multiple hand wheels 162 are equipped around the lid's circumference and can be used to tighten and secure the lid 54 in the closed state, and conversely to loosen and open the lid 54. A gasket, such as an o-ring, can be provided at an interface between the lid 54 and main body of the housing 24 in order to form a seal therearound upon closure.

Figure 20:
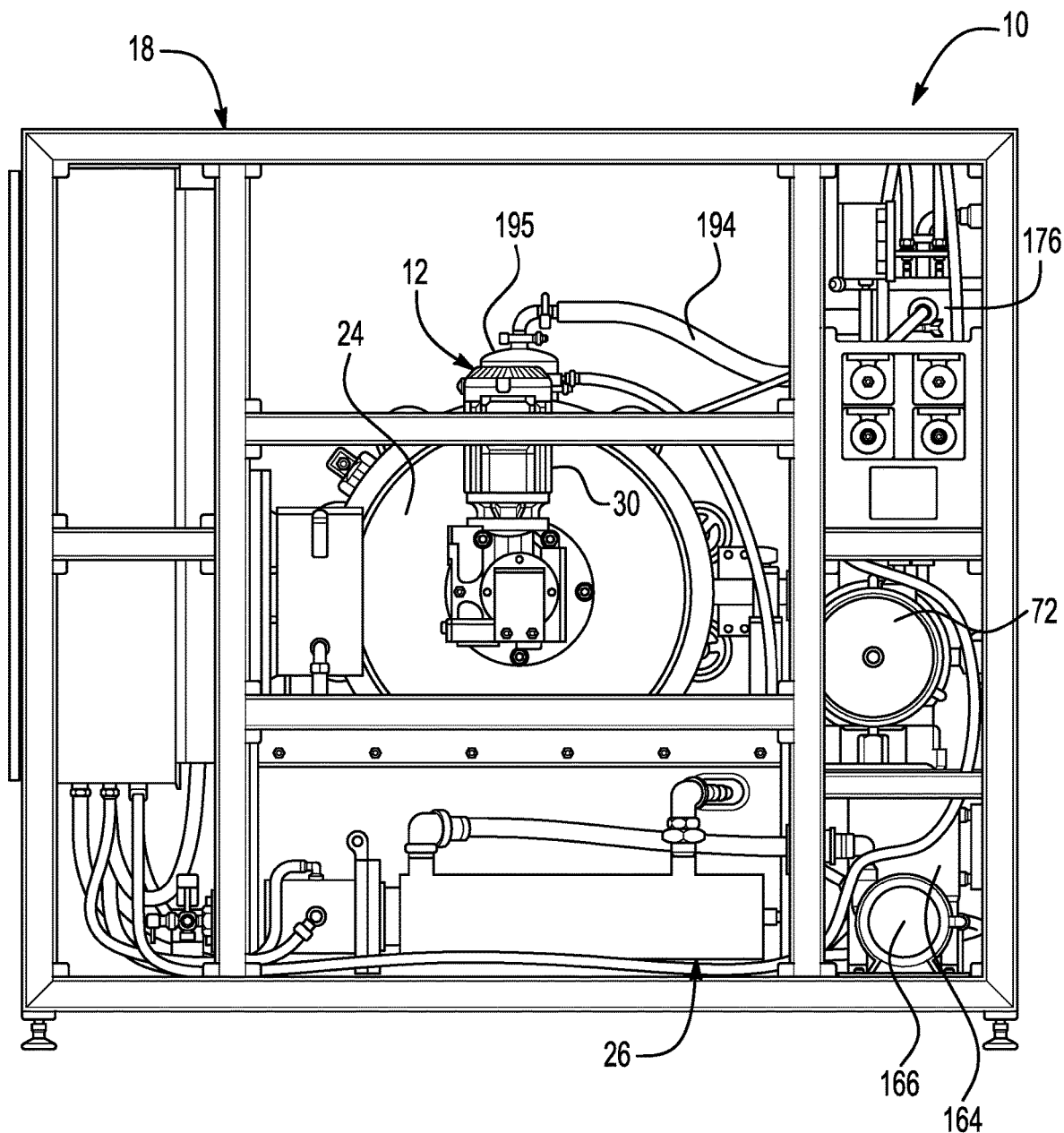
FIG. 20 is a rear view of the second embodiment of the terpene extraction system.
Figure 21:
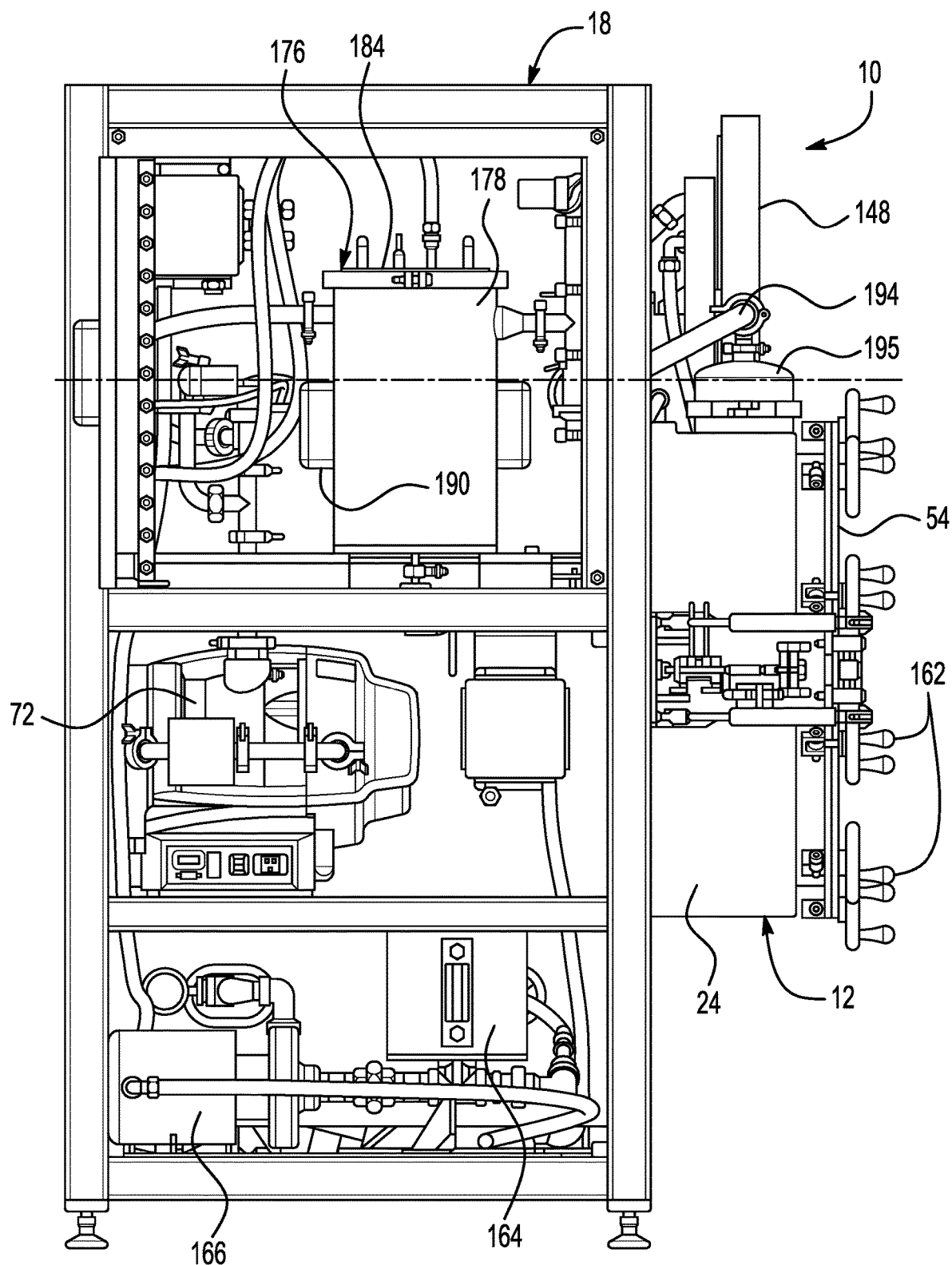
FIG. 21 is a side view of the second embodiment of the terpene extraction system, with a guard open in order to view certain components.
Figure 22:
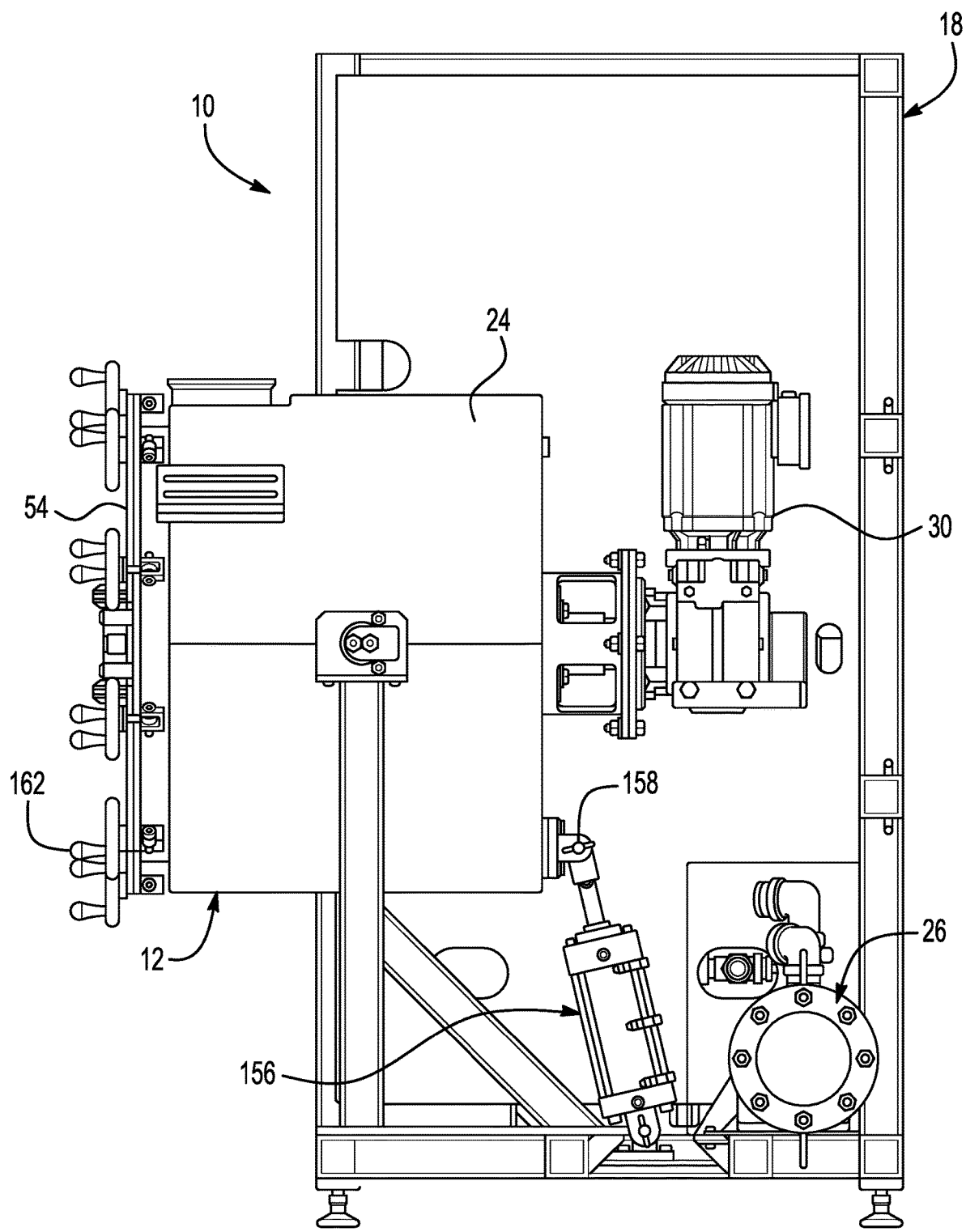
FIG. 22 is a sectioned side view of certain components of the second embodiment of the terpene extraction system.
Figure 23:
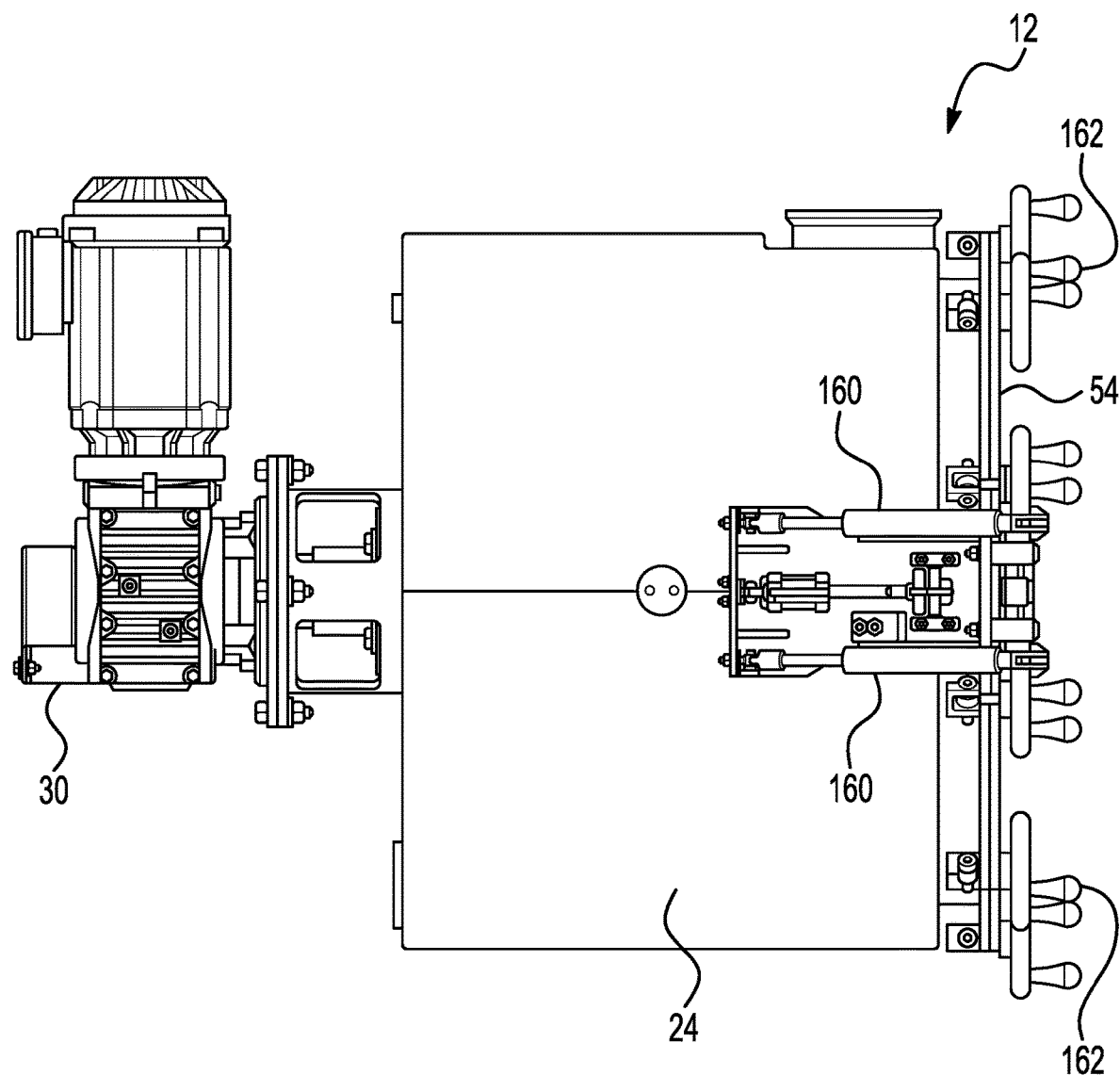
FIG. 23 is a side view of an embodiment of a reactor assembly that can be equipped in the second embodiment of the terpene extraction system.

The heater 26 serves to increase the temperature of the housing's interior 32, and in turn to increase the temperature of the plant biomass residing in the interior 32. Fluid, such as water, is heated by the heater 26 and pumped and circulated through the outer through-passage 40. The heater 26 can have different designs, constructions, and components in various embodiments depending upon among other factors—the size of the housing 24 and the amount of plant biomass to be subjected to heating. With reference to FIGS. 20 and 21, in this embodiment the heater 26 is an assemblage that includes an expansion tank 164 and a pump 166, in addition to the heater itself. The assemblage can establish a closed loop of fluid flow. The heater 26, expansion tank 164, and pump 166 are mounted at the frame assembly 18 a short distance from the housing 24, and the three components fluidly communicate with one another via tubing, piping, hosing, and/or fittings. The heater 26 fluidly communicates with the outer through-passage 40 via tubing, piping, hosing, and/or fittings. The water can be heated within a range of approximately fifty degrees Celsius (50° C.) and one-hundred degrees Celsius (100° C.); still, in other examples the temperature can vary in value depending upon the particular plant biomass subject to terpene extraction. The expansion tank 164 accommodates thermal expansion of the heated water, and the pump 166 moves the heated water for circulation in the outer through-passage 40. In an example, the pump 166 could be provided by the ITT Goulds Pumps company of Seneca Falls, New York, U.S.A.; still, other types of pumps and other models from other companies could be implemented in other embodiments.

Referring to FIG. 24, the agitator 28 in the second embodiment has a single paddle 168 that steadily stirs the plant biomass in the housing's interior 32 and keeps the plant biomass moving amid operation of the reactor assembly 12. The paddle 168 spans wholly across the interior 32 in an axial direction between the lid 54 and the housing's backside. The paddle 168 is supported and suspended close to an inside surface 170. The inside surface 170 partly establishes the interior 32. A small clearance can be defined between the paddle 168 and the inside surface 170. The paddle 168 can slightly skim the inside surface 170 as it revolves during use. Multiple arms 172 and cross bars 174 structurally support and carry the paddle 168. The arms 172 extend from the shaft 58. As before, the motor 30 drives rotational movement of the paddle 168 about the shaft 58. Further, and referring now to FIGS. 20 and 21, the vacuum pump 72 in the second embodiment decreases the pressure at the interior 32. A vacuum condition is applied to the interior 32 by the vacuum pump 72. The vacuum pump 72 can communicate with the interior 32 via tubing, piping, hosing, and/or fittings. Per an example, the pressure within the reactor assembly 12 is reduced to approximately 5 to 1,000 microns; still, other reduction values could be implemented in other embodiments. Once a batch of plant biomass is processed by the reactor assembly 12, the resultant water and terpene vapor mixture is then transferred downstream of the reactor assembly 12 via a sweeping or purging of the interior 32 by a sweeping agent such as nitrogen.

The second embodiment of the terpene extraction system 10 has a single cold trap 176 situated downstream of the reactor assembly 12 and fluidly communicating with the reactor assembly 12 via tubing, piping, hosing, and/or fittings. Resultant water and terpene vapor mixture produced upstream by the reactor assembly 12 is received by the cold trap 176, condensed, frozen, and hence captured thereby. Subsequent thawing and separation can take place offline and at a discrete station and location apart from the terpene extraction system 10, as described more below. Further, the vacuum pump 72 can communicate via tubing, piping, hosing, and/or fittings with the cold trap 176 in order to induce a pressure reduction thereat, and consequently move water and terpene vapor mixture through the cold trap 176. The cold trap 176 can have different designs, constructions, and components in various embodiments. In the embodiment of FIGS. 25-29, the cold trap 176 has a housing 178, a partition wall 180, and a coolant or dip tube 182.

Figure 19:
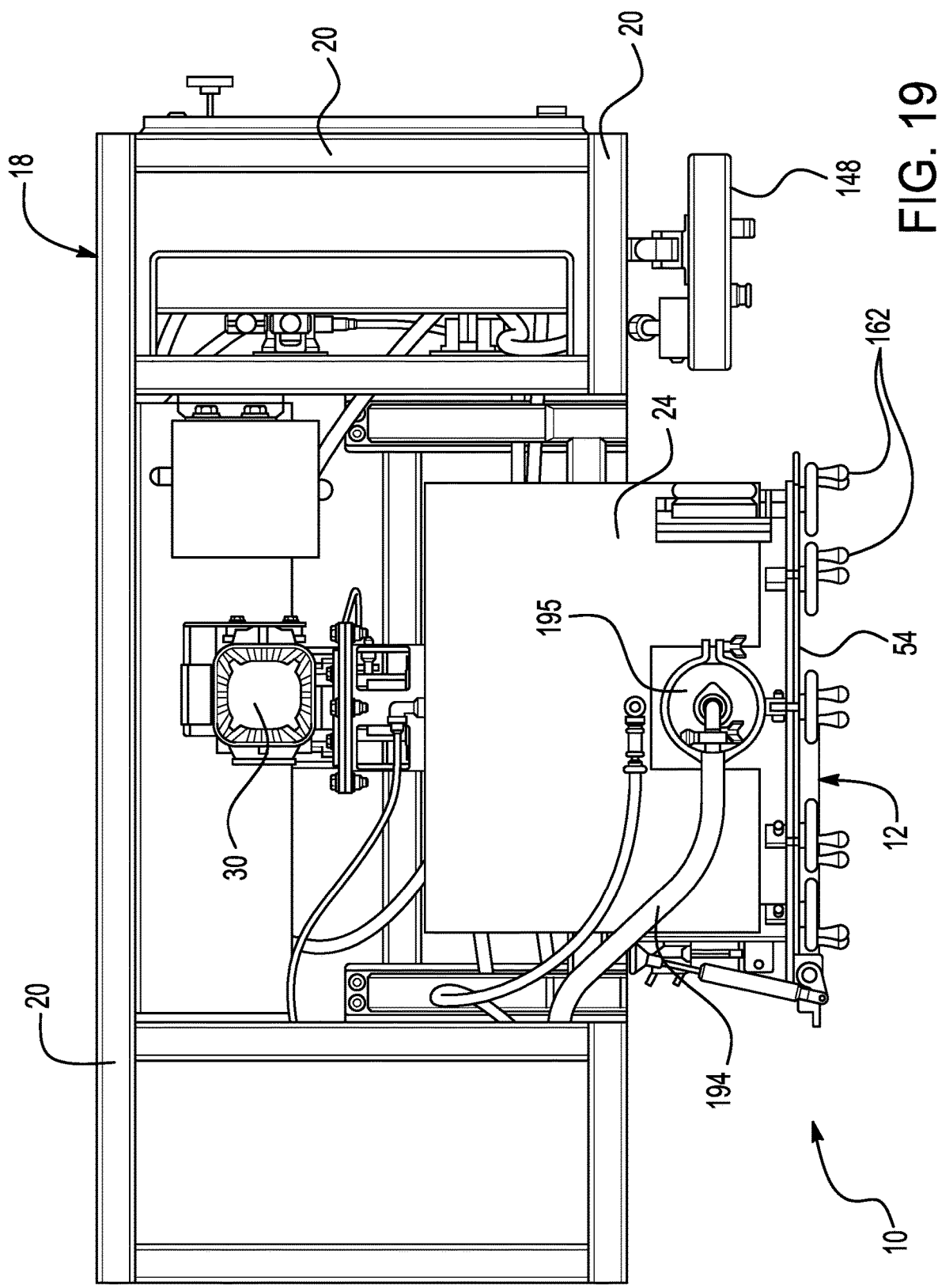
FIG. 19 is a top view of the second embodiment of the terpene extraction system.

The housing 178 is generally cylindrical in shape according to this embodiment. A cover and top wall 184 encloses one end, and a bottom wall 186 encloses the opposite end. A clamp 188 furnishes a securement at the cover 184. Handles 190 allow physical carrying and transport of the cold trap 176 by a user, as well as install and uninstall actions of the cold trap 176 on and off of the terpene extraction system 10. An inlet 192 and port receives entry of the resultant water and terpene vapor mixture into the cold trap 176. The resultant water and terpene vapor mixture travels from the reactor assembly 12 and to the cold trap 176 via a main tube or hose 194 (FIGS. 19-21). A bowl reducer 195 and a filter can be equipped between the reactor assembly 12 and the main hose 194, as shown. Opposite the inlet 192, an outlet 196 and port allows exit of the uncaptured water and terpene vapor mixture, if any, and downstream of the cold trap 176 to exhaust outside of the terpene extraction system 10. Further, the housing 178 has an outer housing or tube wall 198, and has an inner housing or tube wall 200 inserted therein. In an example, the outer tube wall 198 has a ten-inch (10") diameter and the inner tube wall 200 has a six-inch (6") diameter; still, other diameter dimensions are possible in other examples. The inner tube wall 200 has an axial extent (relative to the housing's cylindrical shape) that is shorter than an axial extent of the outer tube wall 198. The inner tube wall 200 has a closed end at a bottom wall 202 thereof.

Figure 27:
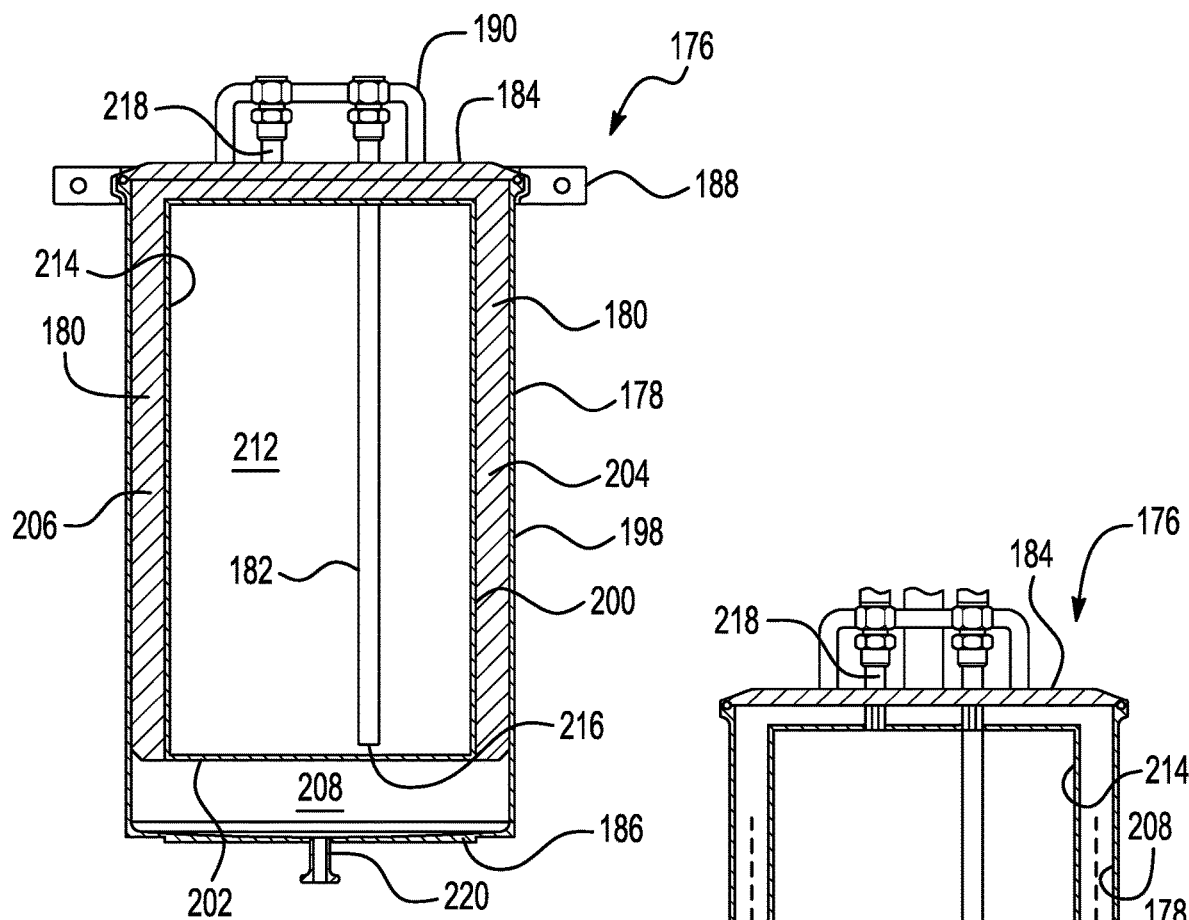
FIG. 27 is a sectional view of the cold trap of FIG. 25.
Figure 28:
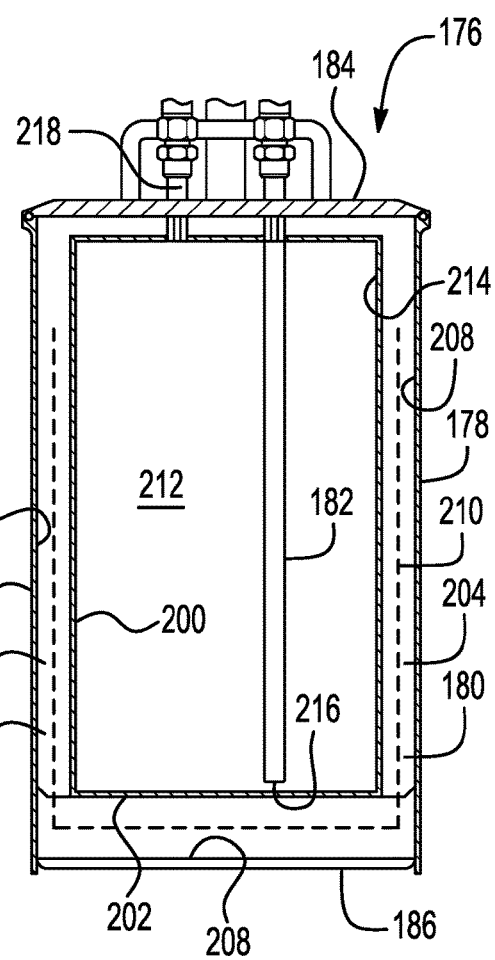
FIG. 28 is another sectional view of the cold trap of FIG. 25.
Figure 29:
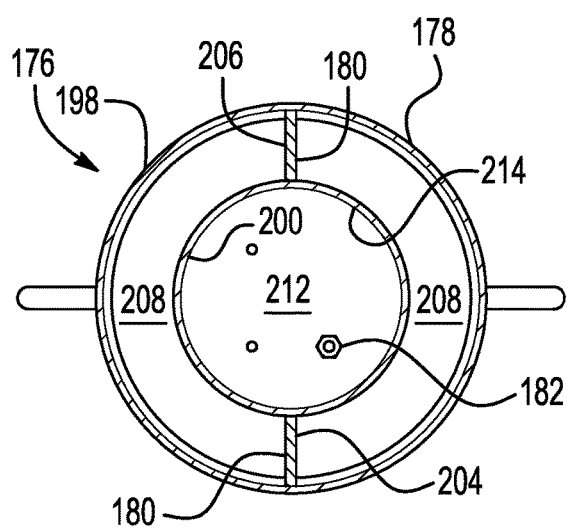
FIG. 29 is yet another sectional view of the cold trap of FIG. 25.

The partition wall 180 extends between the outer tube wall 198 and the inner tube wall 200, as illustrated in FIGS. 27 and 29. The partition wall 180 is made-up of a first portion 204 and a second portion 206. The first and second portions 204, 206 can constitute discrete wall sections of the partition wall 180. The first portion 204 spans wholly between the outer and inner tube walls 198, 200 in a radial direction (relative to the cylindrical shape) on one side of the outer and inner tube walls 198, 200. In a similar manner, the second portion 206 spans wholly between the outer and inner tube walls 198, 200 in the radial direction, but on an opposite side of the outer and inner tube walls 198, 200 with respect to the location of the first portion 204. The partition wall 180 is coextensive in the axial direction with the inner tube wall 200. An interior passage 208 is established between the outer and inner tube walls 198, 200, and is established between the bottom walls 186, 202. A fluid-flow pathway from the inlet 192 and to the outlet 196 is thereby established. The partition wall 180 serves to divert fluid-flow that would otherwise occur between sides of the outer and inner tube walls 198, 200, compelling a more circuitous path downward and between the bottom walls 186, 202. The path of water and terpene vapor mixture is represented in FIG. 28 by a broken line 210. In this way, the water and terpene vapor mixture has increased exposure to the confronting surfaces of the inner tube wall 200, promoting enhanced condensation and freezing thereat and thereagainst.

The dip tube 182 delivers coolant to a cavity 212 established at an interior 214 of the inner tube wall 200 in order to effect cooling at the inner tube wall 200 and cooling at the bottom wall 202. The cavity 212 is separate from the interior passage 208 and walled-off therefrom by the inner tube wall 200 and by the bottom wall 202. As depicted in the sectional views of FIGS. 27 and 28, the dip tube 182 passes through the cover and top wall 184 and spans downward toward and close to the bottom wall 202. An open end 216 of the dip tube 182 is spaced a small distance above the bottom wall 202 for depositing coolant thereat. In an example, the coolant is liquid nitrogen ($LN_2$); still, the coolant could be something else in other examples. The temperature in the cold trap 176 and at the inner tube wall 200 can be brought to a range of approximately negative one-hundred-and-sixty degrees Celsius (−160° C.) and negative one-hundred-and-eighty degrees Celsius (−180° C.) when activated during use; still, in other examples the temperature at the inner tube wall 200 can vary in value. In the $LN_2$ example, consequential nitrogen gas can exit the cavity 212 by way of an outlet 218 at the cover and top wall 184. Further, thermocouples 152 can be deployed at fittings 219 in the cover and top wall 184.

Once processing at the cold trap 176 is complete, frozen water and terpene adhered to surfaces defining the interior passage 208—such as exterior surfaces of the inner tube wall 200 and bottom wall 202—can be thawed and melted to a liquid state. According to an embodiment, the cold trap 176 is taken offline and uninstalled from the terpene extraction system 10. The cold trap 176 is carried to a melt-out station in which compressed air can be blown through the cavity 212 via the inlet at the dip tube 182. The compressed air can be room temperature air or heated air, and promotes thawing and melting. The liquid water and terpene mixture exits the cold trap 176 via a collection outlet 220 (FIGS. 26 and 27) and, from there, can be poured into the separatory funnel(s) for separation and isolation. In addition, while the cold trap 176 is offline and the thawing is taking place, a discrete and ready-for-use cold trap can be substituted and installed in the terpene extraction system 10. The terpene extraction system 10 can accordingly continue its operation. Still, in other embodiments, the compressed air need not be employed for thawing.

Designs, constructions, and components described in relation to the first embodiment can be implemented in the second embodiment; and likewise designs, constructions, and components described in relation to the second embodiment can be implemented in the first embodiment. As an example, the primary or secondary cold traps of the first embodiment can be equipped in the terpene extraction system of the second embodiment, and the single cold trap of the second embodiment can be equipped in the terpene extraction system of the first embodiment.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A solventless terpene extraction system, comprising:
   a reactor assembly having a housing and an agitator, said housing having an interior that receives plant biomass, said agitator having at least one paddle situated at said interior;
   a heater interactable with said housing in order to increase a temperature of said interior;
   at least one cold trap situated downstream of said reactor assembly and communicable with said housing, wherein said at least one cold trap condenses and freezes a water and terpene vapor mixture without a solvent; and
   a vacuum pump communicable with said interior of said housing in order to reduce a pressure within said interior;
   wherein, during use of the terpene extraction system, said agitator and said at least one paddle stir the plant biomass at said interior, said heater increases the temperature at said interior, and said vacuum pump reduces the pressure within said interior concurrently in order to cause vaporization within said interior and produce the water and terpene vapor mixture, and wherein the stirring and increase in temperature and reduction in pressure and caused vaporization within said interior occurs in the absence of a solvent.

2. The solventless terpene extraction system as set forth in claim 1, wherein said housing has a jacketed construction with a first outer wall and a second outer wall establishing an outer through-passage therebetween, fluid heated via said heater is circulated through said outer through-passage and increases the temperature of said interior.

3. The solventless terpene extraction system as set forth in claim 1, wherein said housing has a first inner wall and a second inner wall located at said interior and establishing an inner through-passage therebetween, fluid heated via said heater is circulated through said inner through-passage and increases the temperature of said interior.

4. The solventless terpene extraction system as set forth in claim 1, wherein said at least one paddle includes a plurality of paddles, said plurality of paddles stirring the plant biomass received in said interior of said housing amid use of the terpene extraction system.

5. The solventless terpene extraction system as set forth in claim 1, wherein said reactor assembly includes a motor, said motor driving movement of said at least one paddle.

6. The solventless terpene extraction system as set forth in claim 1, wherein said at least one cold trap comprises at least one of a set of fins, a partition wall, at least one perforated plate, or at least one coolant tube.

7. The solventless terpene extraction system as set forth in claim 1, wherein said at least one cold trap has an outer housing wall and an inner housing wall, an interior passage established between said outer housing wall and said inner housing wall.

8. The solventless terpene extraction system as set forth in claim 7, wherein said at least one cold trap has a partition wall extending between said outer housing wall and said inner housing wall, and said at least one cold trap has a coolant tube situated at a cavity established by said inner housing wall.

9. The solventless terpene extraction system as set forth in claim 1, wherein said at least one cold trap includes a primary cold trap situated downstream of said reactor assembly and includes a secondary cold trap situated downstream of said primary cold trap.

10. The solventless terpene extraction system as set forth in claim 9, wherein said at least one cold trap includes a second primary cold trap situated downstream of said reactor assembly, and a second secondary cold trap situated downstream of said second primary cold trap.

11. The solventless terpene extraction system as set forth in claim 10, wherein said second primary cold trap and said second secondary cold trap have a parallel arrangement relative to said primary cold trap and said secondary cold trap.

12. The solventless terpene extraction system as set forth in claim 9, wherein said primary cold trap, said secondary cold trap, or both of said primary and secondary cold traps have a heater that increases the temperature of an interior thereof.

13. A method of extracting terpenes from plant biomass, the method comprising:
   heating the plant biomass in a reactor assembly;
   stirring the plant biomass in said reactor assembly;
   applying a vacuum in said reactor assembly;
   freezing resultant water and terpene vapor mixture from said reactor assembly via at least one cold trap in fluid communication with said reactor assembly and having an integrated heater; and
   thawing the frozen resultant water and terpene vapor mixture via said integrated heater in said at least one cold trap;
   wherein said heating, stirring, and applying the vacuum steps are performed concurrently in said reactor assembly and wherein the method lacks the use of a solvent amid said heating, stirring, and applying the vacuum steps.

14. The method of extracting terpenes from plant biomass as set forth in claim 13, further comprising transferring the resultant water and terpene vapor mixture from said reactor assembly to said at least one cold trap via a sweeping of an interior of said reactor assembly with an inert gas sweeping agent.

15. The method of extracting terpenes from plant biomass as set forth in claim 14, further comprising:

heating a second batch of plant biomass in said reactor assembly after the resultant water and terpene vapor mixture is transferred to said at least one cold trap and while the frozen resultant water and terpene vapor mixture is being thawed;

stirring the second batch of plant biomass in said reactor assembly after the resultant water and terpene vapor mixture is transferred to said at least one cold trap and while the frozen resultant water and terpene vapor mixture is being thawed; and applying a vacuum in said reactor assembly and subjecting the second batch of plant biomass thereto after the resultant water and terpene vapor mixture is transferred to said at least one cold trap and while the frozen resultant water and terpene vapor mixture is being thawed.

16. The method of extracting terpenes from plant biomass as set forth in claim 13, further comprising condensing the resultant water and terpene vapor mixture via said at least one cold trap prior to said freezing step.

\* \* \* \* \*